United States Patent
Naono

(10) Patent No.: US 12,181,661 B2
(45) Date of Patent: Dec. 31, 2024

(54) MICROMIRROR DEVICE

(71) Applicant: FUJIFILM Corporation, Tokyo (JP)

(72) Inventor: Takayuki Naono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 530 days.

(21) Appl. No.: 17/508,320

(22) Filed: Oct. 22, 2021

(65) Prior Publication Data

US 2022/0043257 A1 Feb. 10, 2022

Related U.S. Application Data

(63) Continuation of application No. PCT/JP2020/017849, filed on Apr. 24, 2020.

(30) Foreign Application Priority Data

Apr. 26, 2019 (JP) .................................. 2019-086635

(51) Int. Cl.
| | |
|---|---|
| G02B 26/00 | (2006.01) |
| G02B 26/08 | (2006.01) |
| G02B 26/10 | (2006.01) |

(52) U.S. Cl.
CPC ....... *G02B 26/101* (2013.01); *G02B 26/0858* (2013.01)

(58) Field of Classification Search
CPC ............. G02B 26/101; G02B 26/0858; G02B 26/085; G02B 26/105

(Continued)

(56) References Cited

U.S. PATENT DOCUMENTS

| | | | |
|---|---|---|---|
| 7,436,567 B2 | 10/2008 | Ueyama | |
| 9,395,536 B2 | 7/2016 | Yasuda et al. | |

(Continued)

FOREIGN PATENT DOCUMENTS

| | | |
|---|---|---|
| CN | 113574007 A | 10/2021 |
| EP | 2 827 183 A1 | 1/2015 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/017849, dated Nov. 4, 2021, with an English translation.

(Continued)

*Primary Examiner* — James C. Jones
*Assistant Examiner* — Henry Duong
(74) *Attorney, Agent, or Firm* — Birch, Stewart, Kolasch & Birch, LLP

(57) ABSTRACT

In a micromirror device, the upper electrode of the piezoelectric element consists of a plurality of individual electrode parts, each of which is separated by a first stress inversion region and a second stress inversion region. In the first stress inversion region, positive and negative, of a principal stress component having a maximum absolute value among a principal stress, are inverted in a maximum displacement state, in a case of driving in a first resonance mode in which the mirror part is tilted and oscillated around the first axis. In the second stress inversion region, positive and negative, of a principal stress component having a maximum absolute value among a principal stress, are inverted, in a case of driving in a second resonance mode in which the mirror part is tilted and oscillated around the second axis.

7 Claims, 15 Drawing Sheets

(58) Field of Classification Search
USPC .................................................. 359/199.3
See application file for complete search history.

(56) References Cited

U.S. PATENT DOCUMENTS

| | | |
|---|---|---|
| 2013/0194555 A1 | 8/2013 | Davis et al. |
| 2014/0355088 A1* | 12/2014 | Yasuda .............. G02B 26/0858 29/25.35 |
| 2017/0199375 A1 | 7/2017 | Naono |
| 2017/0205624 A1 | 7/2017 | Naono |
| 2018/0067304 A1 | 3/2018 | Hattass et al. |

FOREIGN PATENT DOCUMENTS

| | | |
|---|---|---|
| EP | 3 950 572 A1 | 2/2022 |
| JP | 9-101474 A | 4/1997 |
| JP | 2011-107505 A | 6/2011 |
| JP | 2011-227216 A | 11/2011 |
| JP | 4984117 B2 | 7/2012 |
| JP | 2012-237788 A | 12/2012 |
| JP | 5151065 B2 | 2/2013 |
| JP | 5397184 B2 * | 1/2014 |
| JP | 6092713 B2 | 3/2017 |
| JP | 2018-41085 A | 3/2018 |
| WO | WO2016/052547 A1 | 4/2016 |
| WO | WO2016/052548 A1 | 4/2016 |

OTHER PUBLICATIONS

International Search Report (Form PCT/ISA/210) for International Application No. PCT/JP2020/017849, dated Jul. 28, 2020, with an English translation.
Japaneses Office Action for corresponding Japanese Application No. 2021-516312, dated Jan. 10, 2023, with an English translation.
Extended European Search Report for corresponding European Application No. 20795484.3, dated May 13, 2022.
Matsuo et al., "Novel Design for Optical Scanner with Piezoelectric Film Deposited by Metal Organic Chemical Vapor Deposition," Japanese Journal of Applied Physics, vol. 49, 2010, 04DL19, pp. 1-4 (5 pages total).
Japanese Office Action for corresponding Japanese Application No. 2021-516312, dated Sep. 6, 2022, with English translation.
Japanese Office Action for corresponding Japanese Application No. 2021-516312, dated May 9, 2023, with English translation.
Chinese Office Action and Search Report for corresponding Chinese Application No. 202080030775.7, dated Feb. 11, 2023, with English translation.
European Communication pursuant to Article 94(3) EPC for corresponding European Application No. 20795484.3, dated Mar. 21, 2024.

* cited by examiner

MICROMIRROR DEVICE

CROSS-REFERENCE TO RELATED APPLICATIONS

This application is a continuation application of International Application No. PCT/JP2020/017849, filed Apr. 24, 2020, the disclosure of which is incorporated herein by reference in its entirety. Further, this application claims priority from Japanese Patent Application No. 2019-086635, filed Apr. 26, 2019, the disclosure of which is incorporated herein by reference in its entirety.

BACKGROUND OF THE INVENTION

1. Field of the Invention

The present disclosure relates to a micromirror device.

2. Description of the Related Art

A micromirror device (also referred to as a micro-scanner) is known as one of the micro electro mechanical systems (MEMS) devices manufactured by using the microfabrication technology of silicon (Si). Since this micromirror device is small and has low consumed power, it is expected that the micromirror device is applied to head-up displays, retinal displays, and the like using lasers.

As an optical scanning method for displaying images, attention has been focused on a Lissajous scanning method of covering the screen by driving sinusoidally on both the horizontal and vertical axes and drawing a Lissajous waveform, as compared with the raster scanning method that has been common until now. In the Lissajous scanning method, the algorithm of the laser driver is complicated. However, the mirror can be miniaturized, and a wide angle of view can be realized while suppressing the driving consumed power.

There are various driving methods for micromirrors, but the piezoelectric driving method using deformation of a piezoelectric body is promising since the method generates a higher torque than other methods and is capable of obtaining a high scanning angle.

JP6092713B and WO2016/052547A each disclose a piezoelectric mirror device in which a mirror part is connected to a pair of semi-annular piezoelectric actuators through a torsion bar and the mirror part is able to rotate and oscillate around the torsion bar as an axis. JP6092713B and WO2016/052547A each disclose a method of efficiently driving a mirror by dividing and placing piezoelectric films in accordance with stress distribution generated in the semi-annular piezoelectric actuator in a case of oscillating the mirror part and by giving each driving signal having an appropriate polarity to each of the piezoelectric films divided and placed.

However, since the mirror device disclosed in JP6092713B and WO2016/052547A is able to scan only in one axis direction, an image cannot be displayed with one chip.

On the other hand, JP5151065B, JP4984117B, and JP2018-41085A propose a piezoelectric drive type optical scanner capable of two-dimensional scanning as a micromirror device.

JP5151065B discloses an optical scanner having a configuration in which the mirror part is connected to the movable frame through the first connecting part along the first axis and the movable frame is connected to the fixed frame surrounding the movable frame through the piezoelectric actuator. The movable frame and the piezoelectric actuator are connected by a second connecting part along the second axis orthogonal to the first axis, and the piezoelectric actuator is further connected to the fixed frame by a third connecting part along the first axis. A pair of movable parts are connected to each of the two third connecting parts disposed on the axis across the mirror part, and a total of four movable parts oscillate the mirror part around two axes together with the movable frame. Thereby, a two-dimensional light scanning operation is realized.

JP4984117B discloses an optical scanner comprising: a mirror part; a first actuator part that is disposed so as to surround the mirror part and connected to the mirror part through a first torsion bar extending along a first axis; an internal movable frame that is disposed outside the first actuator part and is connected to the first actuator part on the axis of the first torsion bar; and a second actuator part which is disposed so as to surround the internal movable frame and is connected to the internal movable frame through the second torsion bar. The first actuator part applies torque around the first axis to the mirror part, and the second actuator part applies torque around the second axis to the mirror part, thereby realizing a two-dimensional light scanning operation.

In JP2018-41085A, the mirror part is connected to the first frame device (the movable frame) that surrounds the mirror part through the first torsion bar, and the first frame device is connected to an actuator structure that surrounds the first frame device through the second torsion bar. Further, a configuration, in which the actuator structure is connected to a second frame device that surrounds the actuator through a third torsion bar, is disclosed. The actuator structure comprises four movable parts symmetrical to the first axis and the second axis, and the mirror part is rotated around the two axes by the four movable parts. Thereby, a two-dimensional light scanning operation is realized.

SUMMARY OF THE INVENTION

According to JP5151065B, JP4984117B, and JP2018-41085A, two-dimensional scanning is possible with one chip. However, in each of the optical scanners of JP5151065B, JP4984117B, and JP2018-41085A, independent rotation is performed around each of two axes. Therefore, at least two rectangular or ring-shaped actuators (or movable frames) are disposed so as to surround the mirror through two torsion bars which are in charge of rotation around each axis. Therefore, the overall chip size increases.

The present disclosure has been made in view of the above circumstances, and an object thereof is to provide a micromirror device capable of two-dimensional scanning and having a small size.

Specific means for solving the above problems includes the following aspects.

<1>

A micromirror device comprising:

a mirror part that has a reflecting surface configured to reflects incident light;

an actuator that has an annular shape and surrounds the mirror part;

a first connecting part that connects the mirror part and the actuator, such that the mirror part is rotatable around a first axis;

a fixing part that is provided at an outer periphery of the actuator; and a second connecting part that connects the actuator and the fixing part, such that the actuator is rotatable around a second axis intersecting the first axis, wherein:

the actuator applies a rotational torque around the first axis to the mirror part and applies a rotational torque around the second axis to the mirror part so as to rotationally drive the mirror part around the first axis and the second axis, the actuator is a piezoelectric actuator including a piezoelectric element comprising a lower electrode, a piezoelectric film, and an upper electrode laminated on an oscillation plate, and the upper electrode consists of a plurality of individual electrode parts, each of which is separated by a first stress inversion region and a second stress inversion region, and the piezoelectric element includes a plurality of piezoelectric parts respectively defined by the plurality of individual electrode parts, the first stress inversion region being a region in which positive and negative, of a principal stress component having a maximum absolute value among a principal stress generated in an in-plane direction of the piezoelectric film, are inverted in a maximum displacement state, in a case of driving in a first resonance mode in which the mirror part is tilted and oscillated around the first axis, and the second stress inversion region being a region in which positive and negative, of a principal stress component having a maximum absolute value among a principal stress generated in the in-plane direction of the piezoelectric film, are inverted, in a case of driving in a second resonance mode in which the mirror part is tilted and oscillated around the second axis.

<2>

The micromirror device according to <1>, in which the first connecting part connects the mirror part and the actuator on the first axis.

<3>

The micromirror device according to <1> or <2>, in which the second connecting part connects the actuator and the fixing part on the second axis.

<4>

The micromirror device according to any one of <1> to <3>, in which the upper electrode includes at least eight individual electrode parts as the plurality of individual electrode parts, and the plurality of individual electrode parts are disposed symmetrically about the first axis and the second axis.

<5>

The micromirror device according to any one of <1> to <4>, further comprising a drive circuit that inputs a driving signal to each of the plurality of piezoelectric parts of the actuator.

<6>

The micromirror device according to <5>, in which the drive circuit inputs, to the plurality of piezoelectric parts, driving signals for driving the micromirror device in the first resonance mode in which the mirror part tilts and oscillates around the first axis and for driving the micromirror device in the second resonance mode in which the mirror part tilts and oscillates around the second axis.

<7>

The micromirror device according to <6>, in which the drive circuit inputs, as the driving signals, a driving signal obtained by superimposing a first driving signal and a second driving signal, the first driving signal being a signal in which a driving voltage waveform applied to the piezoelectric part located in a region in which the principal stress component having the maximum absolute value is positive, and a driving voltage waveform applied to the piezoelectric part located in a region in which the principal stress component having the maximum absolute value is negative, are in a relationship of opposite phases to each other at a moment at which an oscillation amplitude, in a case of driving in the first resonance mode is maximized, and the second driving signal being a signal in which a driving voltage waveform applied to the piezoelectric part located in a region in which the principal stress component having the maximum absolute value is positive, and a driving voltage waveform applied to the piezoelectric part located in a region in which the principal stress component having the maximum absolute value is negative, are in a relationship of opposite phases to each other at a moment at which an oscillation amplitude in a case of driving in the second resonance mode is maximized.

According to the present disclosure, it is possible to provide a micromirror device that is capable of two-dimensional scanning and has a small size.

DESCRIPTION OF THE PREFERRED EMBODIMENTS

Hereinafter, specific embodiments of the present disclosure will be described, with reference to the drawings.

Figure 1:
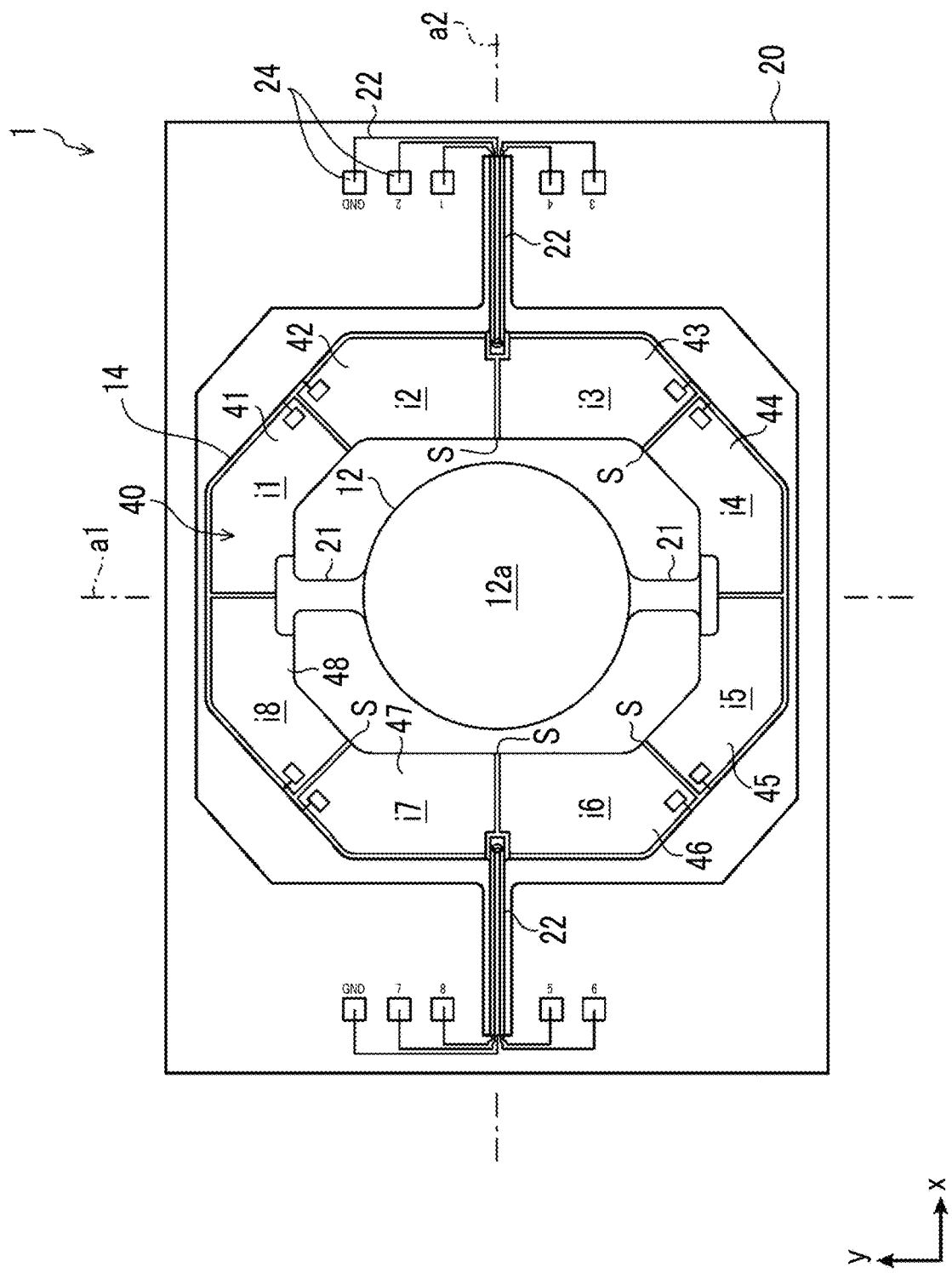
FIG. 1 is a plan view of the micromirror device of an embodiment.
Figure 2:
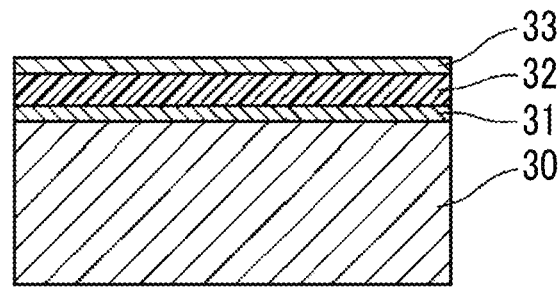
FIG. 2 is a diagram showing a cross-sectional structure of a part of a micromirror device.
Figure 3:
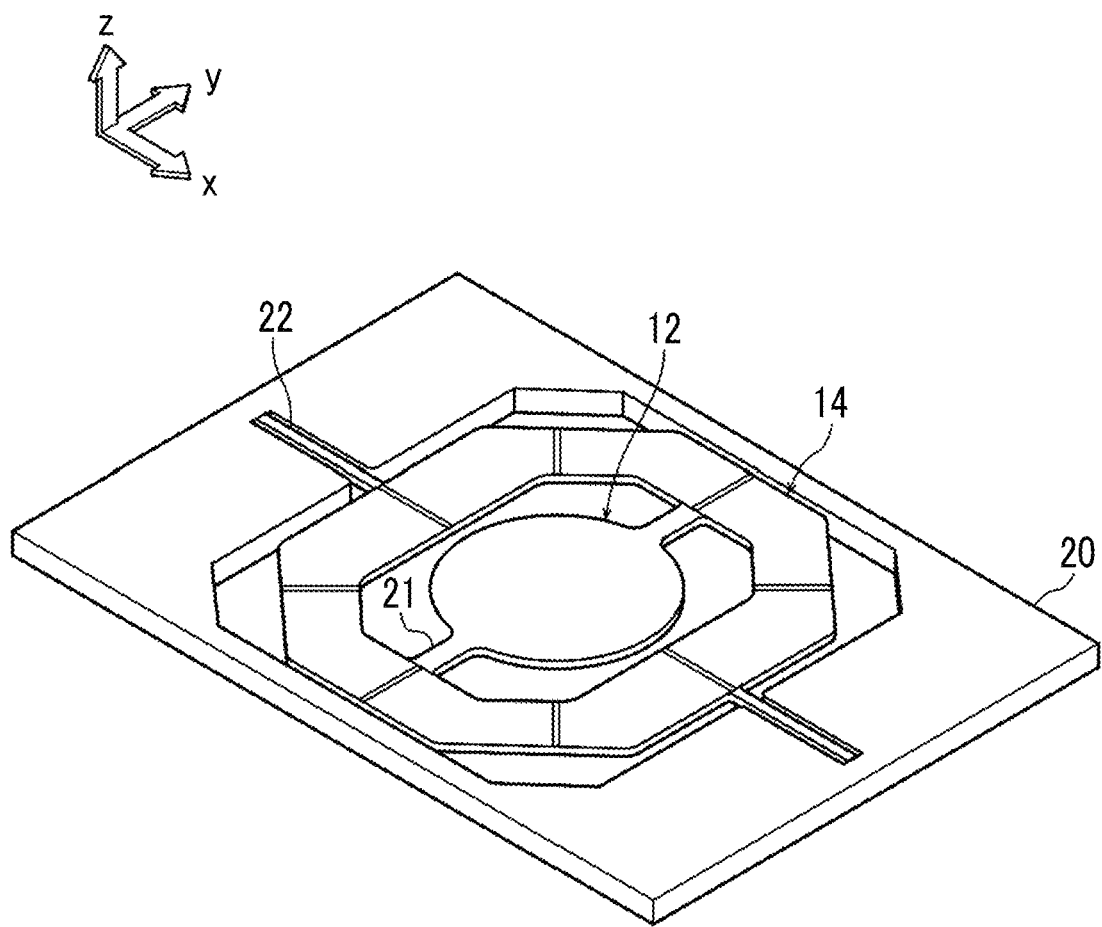
FIG. 3 is a perspective view of the structure of the micromirror device of the embodiment as viewed from the upper surface side.
Figure 4:
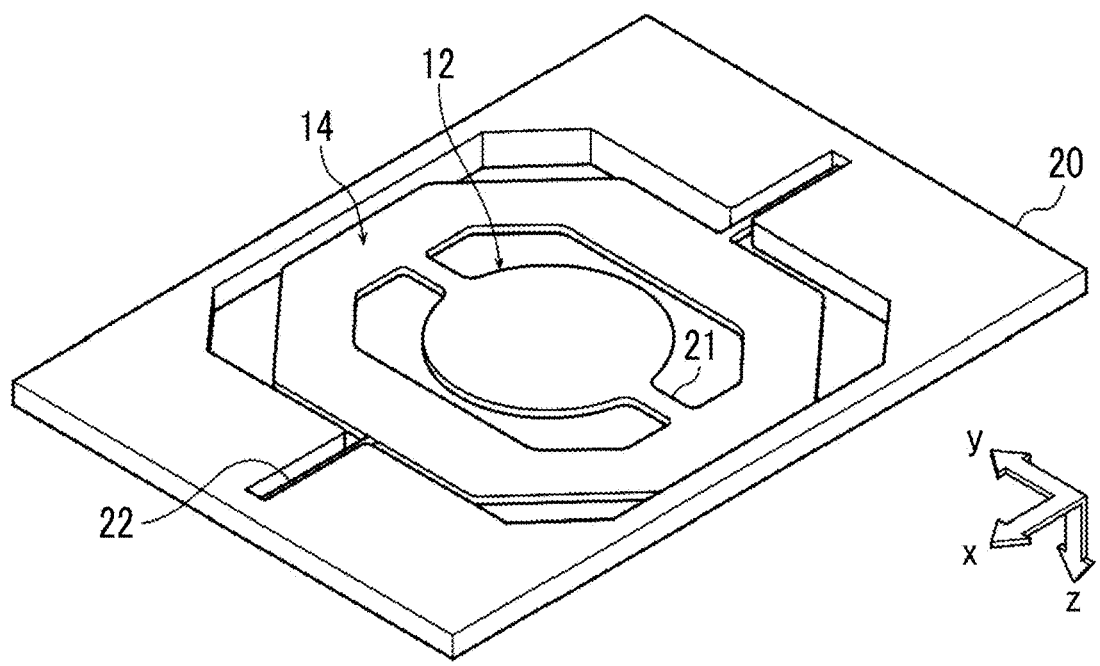
FIG. 4 is a perspective view of the structure of the micromirror device of the embodiment as viewed from the bottom surface side.
Figure 5:
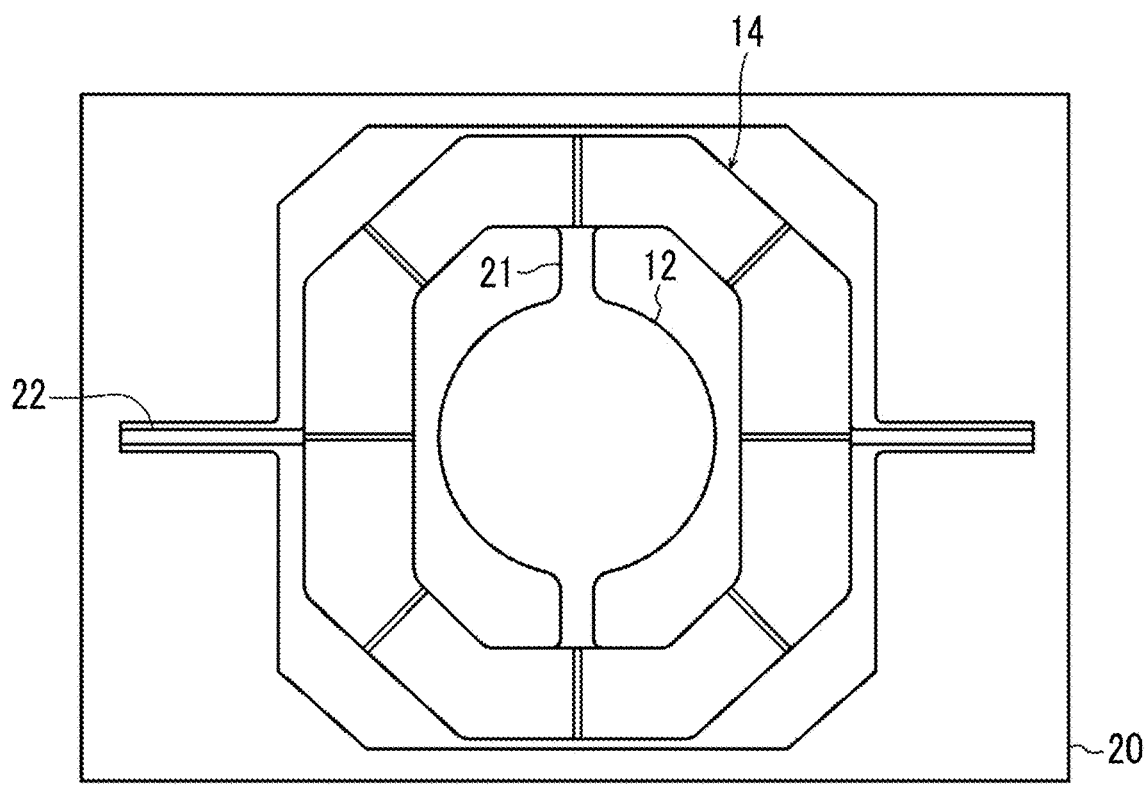
FIG. 5 is a plan view of the structure of the micromirror device of the embodiment.
Figure 6:
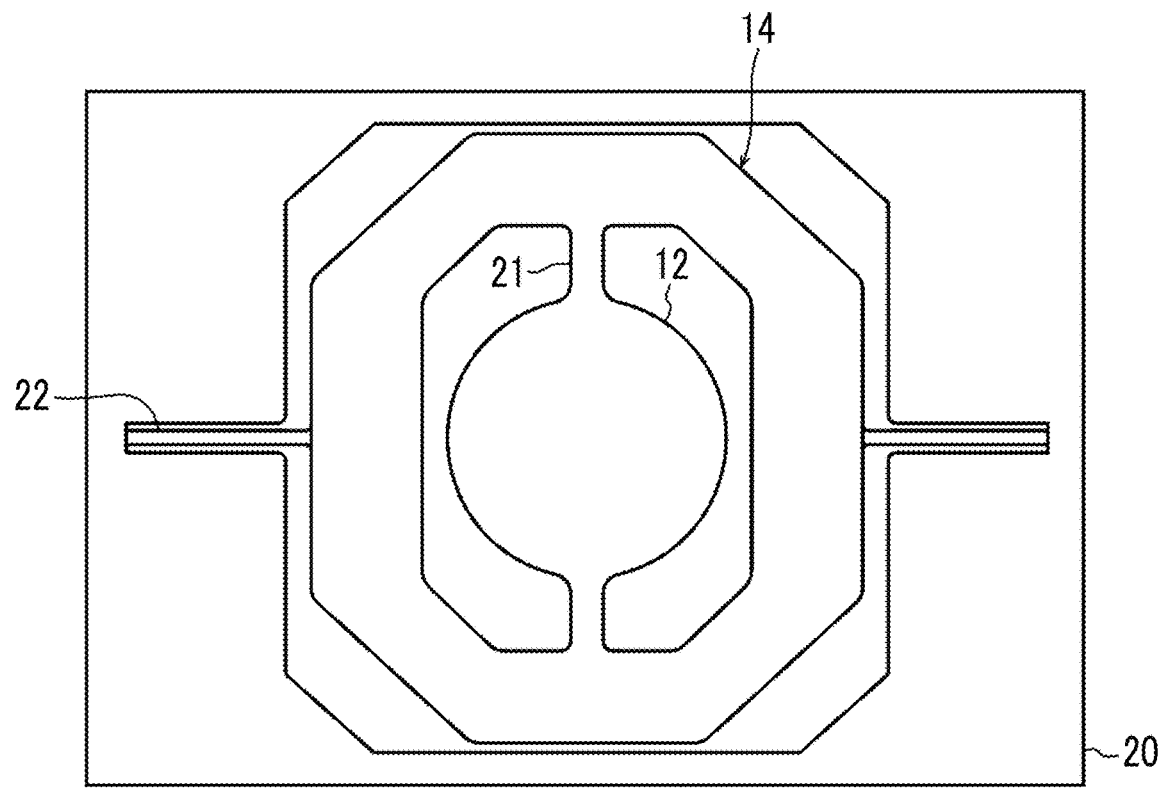
FIG. 6 is a bottom view of the structure of the micromirror device of the embodiment.
Figure 6:
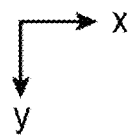
Figure 7:
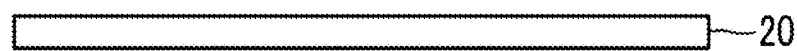
FIG. 7 is a left side view of the structure of the micromirror device of the embodiment.
Figure 7:
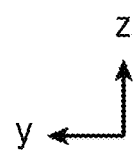
Figure 8:
FIG. 8 is a front view of the structure of the micromirror device of the embodiment.
Figure 8:
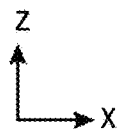

FIG. 1 is a plan view of the micromirror device according to the embodiment. FIG. 2 is a diagram showing a cross-sectional structure of a part of the micromirror device. FIG. 3 is a perspective view of the structure for the micromirror device as viewed from the upper surface side, and shows a state where the micromirror device does not have a wiring structure. FIG. 4 is a perspective view of the structure for the micromirror device of the embodiment as viewed from the bottom surface side. FIG. 5 is a plan view of the structure for the micromirror device of the embodiment, and FIG. 6 is a bottom view of the structure for the micromirror device of the embodiment. FIG. 7 is a left side view of the structure for the micromirror device. It should be noted that the right side view of the structure of the micromirror device is the same as the left side view. FIG. 8 is a front view of the structure of the micromirror device of the embodiment. It should be noted that the rear view of the structure of the micromirror device is the same as the front view.

The micromirror device 1 of the present embodiment comprises a mirror part 12, an annular actuator 14 disposed so as to surround the mirror part 12, a first connecting part 21 connecting the mirror part 12 and the actuator 14, a fixing part 20 disposed at the outer periphery of the actuator 14, and a second connecting part 22 connecting the actuator 14 and the fixing part 20.

Each size of the micromirror device 1 is generally, for example, about 1 mm to 10 mm in length and width, but may be smaller or larger than the above size, and is not particularly limited. Further, the thickness of the movable part is generally about 5 μm to 0.2 mm, but may be within a range in which the actuator can be manufactured, and is not particularly limited.

The mirror part 12 has a reflecting surface 12a that reflects incident light. The reflecting surface 12a consists of a metal thin film such as Au (gold) and Al (aluminum) provided on one surface of the mirror part 12. The material and film thickness used for the mirror coating for forming the reflecting surface 12a are not particularly limited, and various designs can be made using a known mirror material (a high reflectance material).

FIG. 1 exemplifies a mirror part 12 having an approximately circular reflecting surface 12a and having a plan view shape similar to the reflecting surface 12a. However, the plan view shape of the mirror part 12 and the shape of the reflecting surface 12a may be the same or different. The shapes of the mirror part 12 and the reflecting surface 12a are not particularly limited. Not limited to the circular shape exemplified, there may be various shapes such as an ellipse, a square, a rectangle, and a polygon.

The first connecting part 21 connects the mirror part 12 and the actuator 14, and rotatably supports the mirror part 12 around the first axis a1. The first connecting part 21 is a pair of rod-shaped members extending outward along the first axis a1 from the outer periphery of the mirror part 12 symmetrically with the mirror part 12 interposed therebetween, and the mirror part 12 and the actuator 14 are connected on the first axis a1. One end of each of the pair of rod-like members constituting the first connecting part 21 is connected to the outer periphery of the mirror part 12, and the other end of each is connected to the actuator 14.

The second connecting part 22 connects the actuator 14 and the fixing part 20, and rotatably supports the actuator 14 around the second axis a2. The second connecting part 22 is a pair of rod-shaped members extending outward along the second axis a2 from the outer periphery of the actuator 14 symmetrically with the actuator 14 interposed therebetween, and connects the actuator 14 and the fixing part 20 on the second axis a2. One end of each of the pair of rod-like members constituting the second connecting part 22 is connected to the outer periphery of the actuator 14, and the other end of each is connected to the fixing part 20.

With the above configuration, in the present embodiment, the first axis a1 and the second axis a2 intersect at substantially the center of the mirror part 12.

Here, the first axis a1 is in a plane including the reflecting surface 12a of the mirror part 12 in a case where the reflecting surface 12a is stationary. The second axis a2 is an axis that intersects the first axis a1 in this plane, and is an axis that is orthogonal to the first axis a1 in this description. The first axis a1 and the second axis a2 preferably intersect at the center of the reflecting surface 12a, but the position of the intersection may be deviated from the center.

In each drawing, the normal direction of the reflecting surface 12a in a case where the mirror part 12 is stationary is the z-axis direction, the direction parallel to the first axis a1 is the y-axis direction, and the direction parallel to the second axis a2 is the x-axis direction.

The fixing part 20 supports the actuator 14 through the second connecting part 22. The actuator 14 supports the mirror part 12 through the first connecting part 21. The fixing part 20 is provided with a wiring 22, an electrode terminal 24, and the like, and may be further provided with an electronic circuit which is not shown.

In the present example, the fixing part 20 is a frame member (fixing frame) that surrounds the actuator 14. The fixing part 20 is not limited to the frame member as long as the actuator 14 can be supported through the second connecting part 22. The fixing part 20 may be composed of two members of a first fixing part, which is connected to one of the second connecting parts 22, and a second fixing part which is connected to the other thereof.

The actuator 14 is an annular member that surrounds the mirror part 12. The actuator 14 applies a rotational torque to the mirror part 12 around the first axis a1 and applies a rotational torque to the mirror part 12 around the second axis a2, thereby two-dimensionally rotating the mirror part 12 around the first axis a1 and the second axis a2. By driving the mirror part 12 in two-dimensional rotation, the micromirror device 1 reflects the incident light on the reflecting surface 12a of the mirror part 12. Thereby, it is possible to perform two-dimensional scanning. Here, the annular shape may be any shape that surrounds the inner region without interruption, and the inner and outer peripheries may not be circular, and may be any shape such as a rectangular shape or a polygonal shape. In the present example, the inner and outer peripheries of the actuator have octagonal shapes.

Although the details of the two-dimensional rotation drive will be described later, in the micromirror device of the present disclosure, the mirror part 12 can be rotated two-dimensionally by one annular actuator 14 surrounding the mirror part 12. The size of the entire device can be reduced as compared with the conventional structure including two or more actuators (or movable frames).

In the micromirror device 1 of the present example, the mirror part 12, the actuator 14, the fixing part 20, and the first connecting part 21, and the second connecting part 22 are disposed to have a line-symmetrical structure in the first axis a1 and the second axis a2. With such a symmetrical structure, rotational torque can be efficiently applied to the central mirror part 12.

The micromirror device 1 can be manufactured as a structure, in which elements such as the mirror part 12, the actuator 14, the fixing part 20, the first connecting part 21, and the second connecting part 22 are integrally formed, for example, by being processed from a silicon substrate through a semiconductor manufacturing technology.

The fixing part 20 is thicker than the mirror part 12, the actuator 14, the first connecting part 21, and the second connecting part 22 (refer to FIGS. 3 and 4). That is, the thicknesses of the mirror part 12, the actuator 14, the first connecting part 21, and the second connecting part 22 are formed to be less than the thickness of the fixing part 20 (thickness in the z direction). Thereby, the actuator 14, the first connecting part 21, and the second connecting part 22 are easily deformed (for example, bending deformation or twisting deformation). The substrate part is referred to as a structure for a micromirror device. The substrate part excludes the reflecting surface, the piezoelectric film, the electrodes, the wiring, and the like in the mirror part 12, the actuator 14, and the fixing part 20. Further, the part of this structure excluding the fixing part 20 is the body part in the structure. The basic performance of the micromirror device depends on the shape of the body part and does not depend on the shape of the fixing part 20.

The actuator 14 is a piezoelectric actuator provided with a piezoelectric element 40. The piezoelectric element 40 has a laminated structure in which a lower electrode 31, a piezoelectric film 32, and an upper electrode 33 are laminated in this order on the oscillation plate 30 as a movable part substrate (refer to FIG. 2). It should be noted that, in FIG. 2, for the sake of easy visibility, the film thickness ratio is different from the actual film thickness ratio. The "upper" and "lower" of the upper electrode and the lower electrode do not mean the top and bottom. Among the pair of electrodes sandwiching the piezoelectric film, the electrode provided on the oscillation plate side is merely referred to as the lower electrode, and the electrode disposed so as to face the lower electrode with the piezoelectric film interposed therebetween is merely referred to as the upper electrode.

The upper electrode 33 of the piezoelectric element 40 consists of a plurality of individual electrode parts i1 to i8, each of which is separated by a first stress inversion region and a second stress inversion region, and the piezoelectric element 40 includes a plurality of piezoelectric parts 41 to 48 respectively defined by the plurality of individual electrode parts i1 to i8. In the first stress inversion region, positive and negative, of a principal stress component having a maximum absolute value among a principal stress generated in an in-plane direction of the piezoelectric film 32, are inverted in a maximum displacement state, in a case of driving in a first resonance mode in which the mirror part 12 is tilted and oscillated around the first axis a1. In the second stress inversion region, positive and negative, of a principal stress component having a maximum absolute value among a principal stress generated in the in-plane direction of the piezoelectric film 32, are inverted, in a case of driving in a second resonance mode in which the mirror part 12 is tilted and oscillated around the second axis a2. The separation region S of the individual electrode part in FIG. 1 corresponds to the first stress inversion region and/or the second stress inversion region, and is hereinafter referred to as the stress inversion region S. Each principal stress and each stress inversion region will be described later.

In a case where a predetermined voltage is applied to the plurality of piezoelectric parts 41 to 48, the actuator 14 is bent and displaced due to the deformation of the piezoelectric film to generate a driving force. As a result, it is possible to generate a rotational torque in the first connecting part 21 and to generate a rotational torque in the second connecting part 22. In the present micromirror device 1, the upper electrode 33 includes the individual electrode parts according to the stress distribution in the first resonance mode and the stress distribution in the second resonance mode. With such a configuration, two dimensional driving is realized using one annular actuator 14.

The arrangement of the individual electrode parts will be described in detail. The upper electrode 33 of the actuator 14 consists of eight individual electrode parts i1 to i8. The individual electrode parts i1 to i8 are formed separately from each other. By forming the upper electrode 33 such that the upper electrode 33 is separated into a plurality of individual electrode parts i1 to i8, a voltage of each of the piezoelectric parts 41 to 48 defined by the individual electrode parts i1 to i8 can be independently controlled. The individual piezoelectric parts 41 to 48 are composed of individual electrode parts i1 to i8, a facing lower electrode 31, and a piezoelectric film 32 interposed between the lower electrode 31 and the individual electrode parts i1 to i8. The individual electrode parts i1 to i8 and the lower electrode 31 are connected to the drive circuit 50 through the wirings 22 and the electrode terminals 24 (individual reference numerals 1 to 8 and GND).

Figure 9:
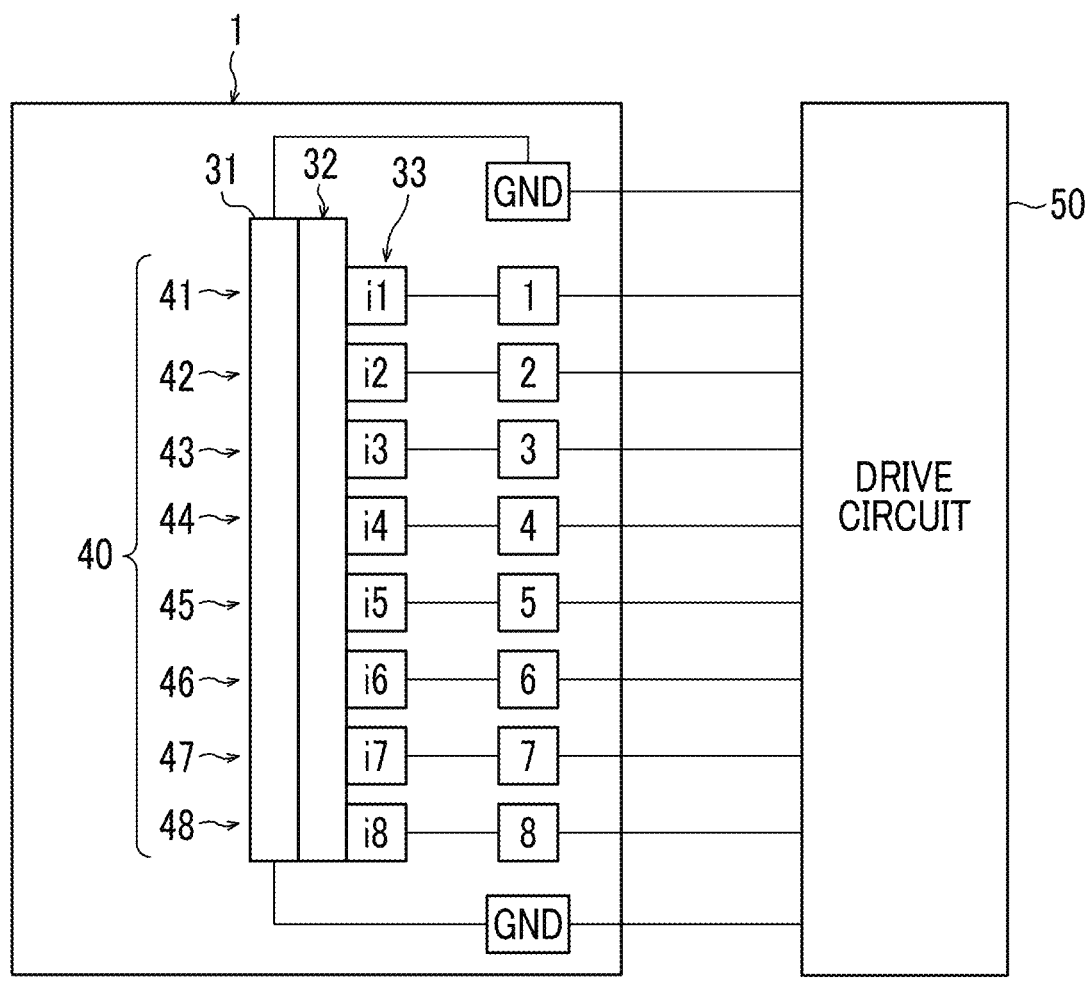
FIG. 9 is a diagram schematically showing connection with a drive circuit of the micromirror device of the embodiment.

FIG. 9 is a block diagram showing an electrical wiring structure between the drive circuit 50 and the piezoelectric parts 41 to 48 of the piezoelectric element 40 of the micromirror device 1 in the present example.

The piezoelectric element 40 comprises a lower electrode 31, a piezoelectric film 32, and an upper electrode 33. The individual electrode parts i1 to i8 of the piezoelectric parts 41 to 48 of the piezoelectric element 40 are connected to the electrode terminals 1 to 8, respectively. The lower electrode 31 is a common film for all the individual electrode parts and is connected to the electrode terminal GND for grounding.

In the present embodiment, the piezoelectric film 32 and the lower electrode 31 are formed as a film common to a plurality of piezoelectric parts. However, the piezoelectric film 32 or the piezoelectric film 32 and the lower electrode 31 may be separated for each individual electrode part of the upper electrode 33.

The micromirror device of the present disclosure can be driven two-dimensionally with only one annular actuator, and thus has a structure that does not have a movable frame and a second actuator. Therefore, the element volume can be suppressed to a small size.

Figure 10:
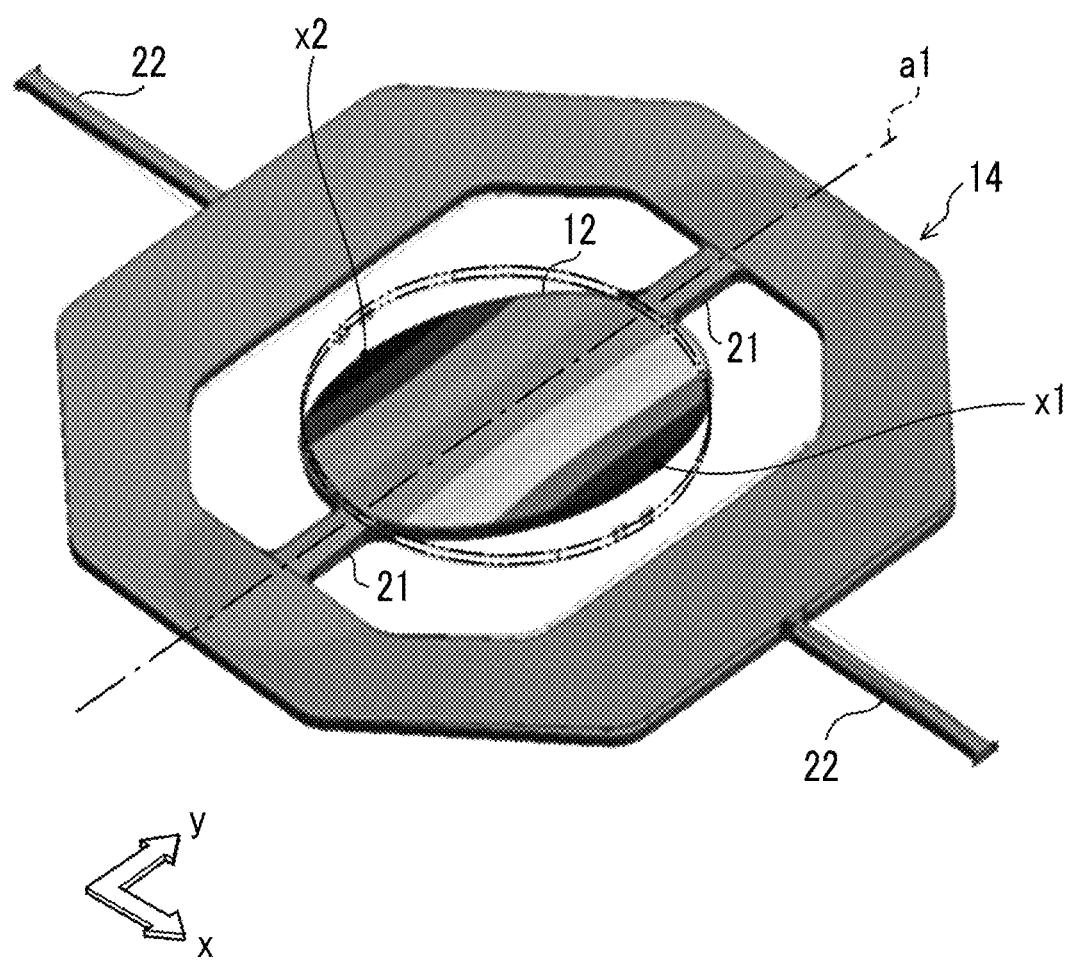
FIG. 10 is a simulation diagram of shape displacement in the first resonance mode accompanied by tilt oscillation of the mirror part around the first axis in the micromirror device of the embodiment.

FIG. 10 is a simulation diagram showing how the mirror part 12 tilts and oscillates around the first axis a1 in the first resonance mode, and shows a state in which one end x1 of the mirror part 12 in the x-axis direction around the first axis a1 as a center is tilted and displaced in the +z direction and the other end x2 thereof in the x-axis direction is tilted and displaced in the −z direction. In FIG. 10, the shade of color indicates the amount of displacement.

Figure 11:
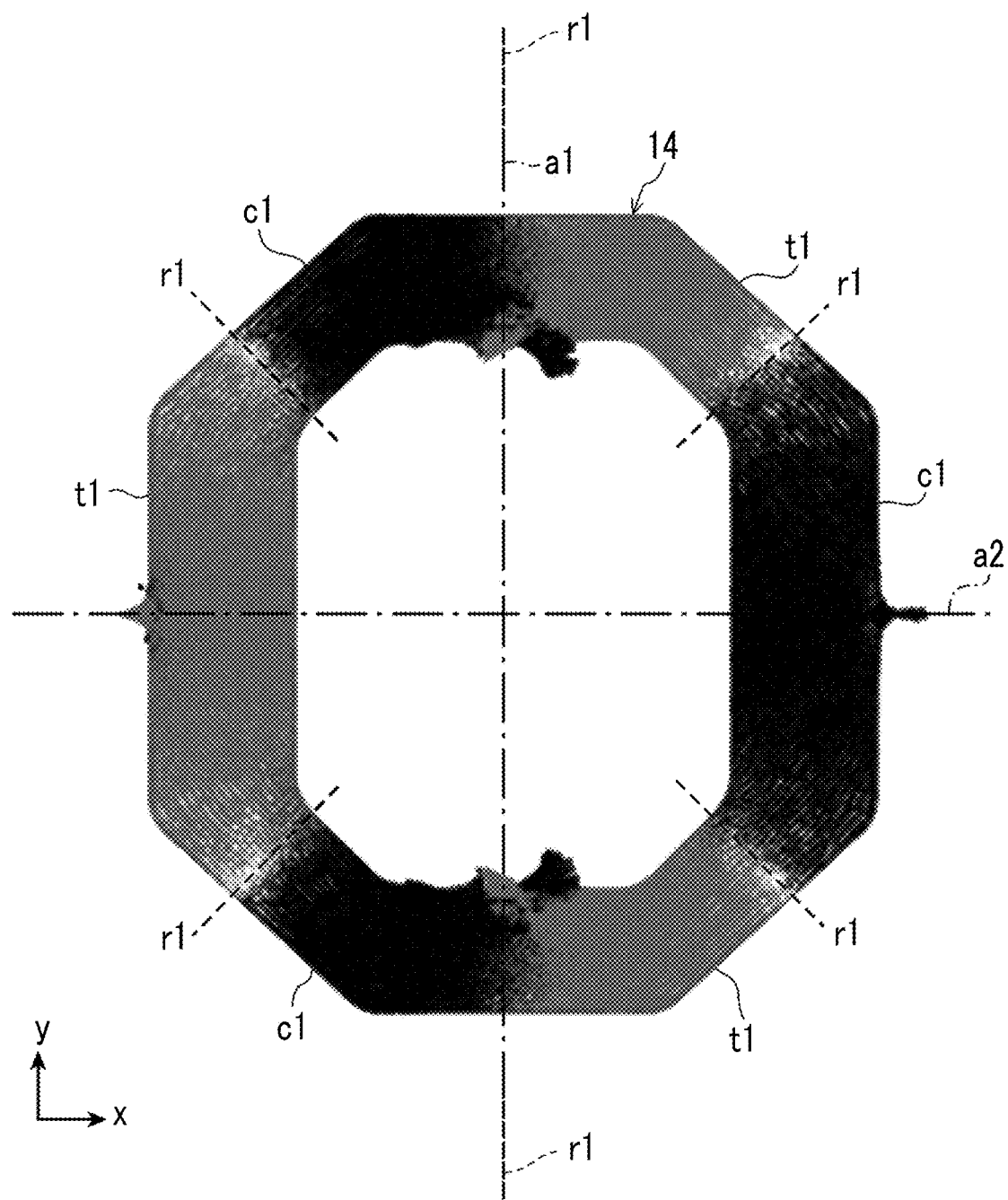
FIG. 11 is a diagram showing in-plane stress distribution generated in an actuator due to shape displacement in the first resonance mode shown in FIG. 10.

In a case where the mirror part 12 tilts and oscillates around the first axis a1 in the first resonance mode and is rotated and displaced as shown in FIG. 10, the actuator 14 bends and deforms. Then, as shown in FIG. 11, tensile stress regions t1 and compressive stress regions c1 are generated. In each tensile stress region, a stress in the tensile direction (hereinafter referred to as a tensile stress) σt is applied to the piezoelectric film of the actuator 14. In each compressive stress region c1, a stress in the compression direction (hereinafter referred to as a compressive stress) σc is applied thereto. In FIG. 11, the part to which the tensile stress is applied is shown in light gray, and the part to which the compressive stress is applied is shown in black. It should be noted that the higher the color density is, the larger the stress is. The stress generated at each position of the piezoelectric film changes with time in accordance with the oscillation. FIG. 11 shows the state of in-plane stress generated in the piezoelectric film at the moment at which the oscillation amplitude in a case of driving in the first resonance mode is maximized.

Whether each part is "compressive stress" or "tensile stress" is defined by the direction in which the absolute value is larger (the direction of the principal stress component having the maximum absolute value) of two principal stresses in a plane substantially orthogonal to the film thickness direction of the piezoelectric film which are selected from three principal stress vectors orthogonal to each other. In a case where the film thickness direction is taken on the z-axis, the two principal stresses in the plane substantially orthogonal to the film thickness direction are the stresses generated in the x-y plane. As the notation method of the stress direction, the vector in the outward direction is defined as the tensile direction, and the vector in the inward direction is defined as the compression direction.

The reason for defining in such a manner is that, in a piezoelectric MEMS device, the dimensions of the actuator part are generally planar, and the stress in the film thickness direction can be regarded as almost 0. The phrase "dimensions are planar" means that the height is sufficiently smaller than the dimensions in the plane direction. The plane direction of the above-mentioned "x-y plane" corresponds to the "in-plane direction orthogonal to the film thickness direction of the piezoelectric film". The stress is defined as follows. The tensile stress σt applying a force in the direction in which the member is pulled is positive, and the compressive stress σc applying a force in the direction in which the member is compressed is negative. That is, the region where the principal stress component having the maximum absolute value is positive means a region where the tensile stress is dominant, and the region where the principal stress component having the maximum absolute value is negative means a region where the compressive stress is dominant. Further, the term "stress inversion region in which the positive and negative, of the principal stress component having the maximum absolute value are inverted" means a region including the boundary between the tensile stress region and the compressive stress region, and a region that the stress changes from the tensile stress to the compressive stress or from the compressive stress to the tensile stress.

As shown in FIG. 11, in the part of the actuator 14 that intersects with the first axis a1, the regions adjacent to each other with the first axis a1 interposed therebetween indicate stresses having different positive and negative stresses. In the drawing, one region adjacent to the first axis a1 is a tensile stress region t1, and the other region is a compressive stress region c1. In the part that intersects with the second axis a2, the regions adjacent to each other across the second axis a2 indicate stresses having the same sign, but the regions symmetric to the first axis a1 indicate stresses having different positive and negative signs. In the first resonance mode, stress distribution in the actuator 14 is axisymmetric with respect to the second axis a2.

At the boundary between the compressive stress region c1 and the tensile stress region t1, the first stress inversion region is present, which is a region where the direction of stress gradually changes, that is, a region where the positive and negative, of the principal stress component having the maximum absolute value are inverted. Each of the six first stress inversion lines r1 shown in FIG. 11 is located at a center of the first stress inversion region.

Figure 12:
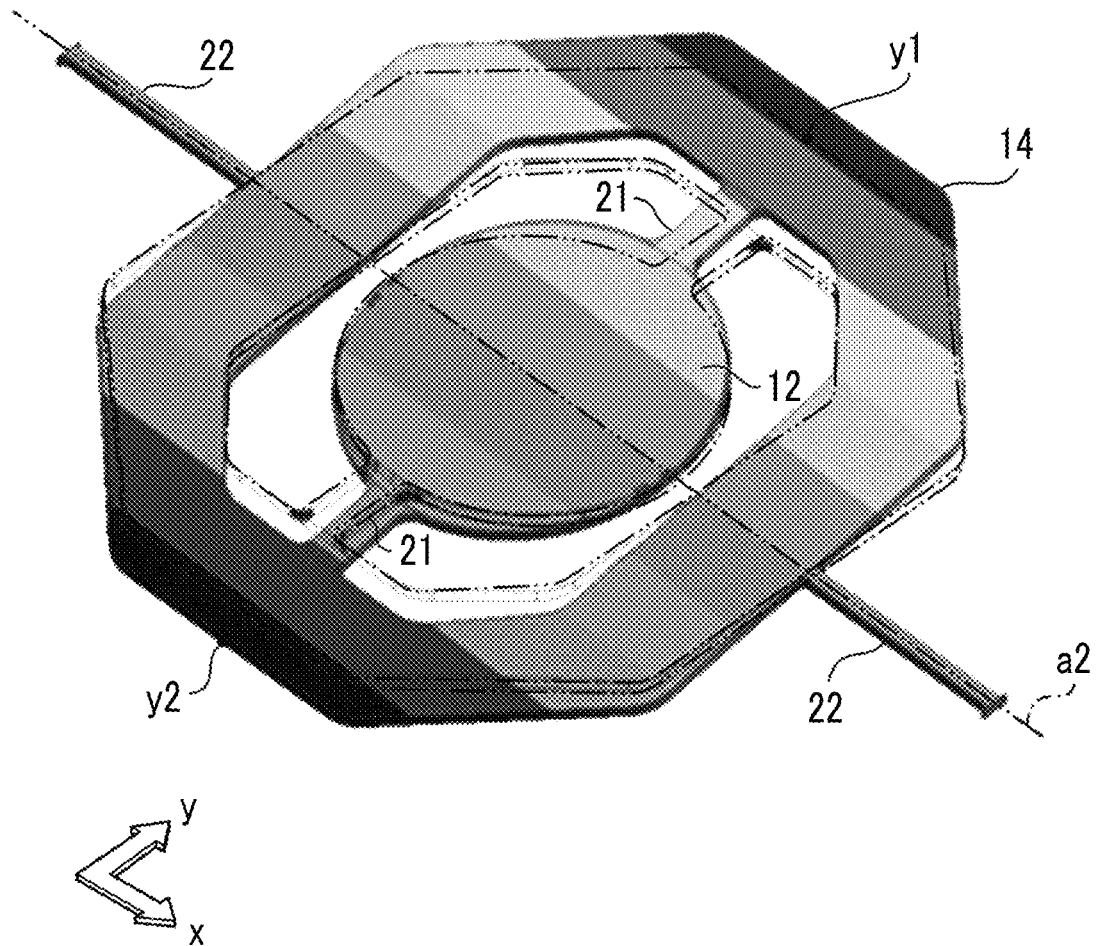
FIG. 12 is a simulation diagram of shape displacement in the second resonance mode accompanied by tilt oscillation of the mirror part around the second axis in the micromirror device of the embodiment.

FIG. 12 is a simulation diagram showing a situation in which the mirror part 12 and the actuator 14 tilt and oscillate around the second axis a2 in the second resonance mode, and shows a state where one end y1 in the y-axis direction of the actuator 14 is tilted and displaced in the +z direction and the other end y2 in the y-axis direction is tilted and displaced in the −z direction with respect to the second axis a2 as a center of the mirror part 12 and the actuator 14. Similarly to FIG. 10, in FIG. 12, the shade of color indicates the amount of displacement.

Figure 13:
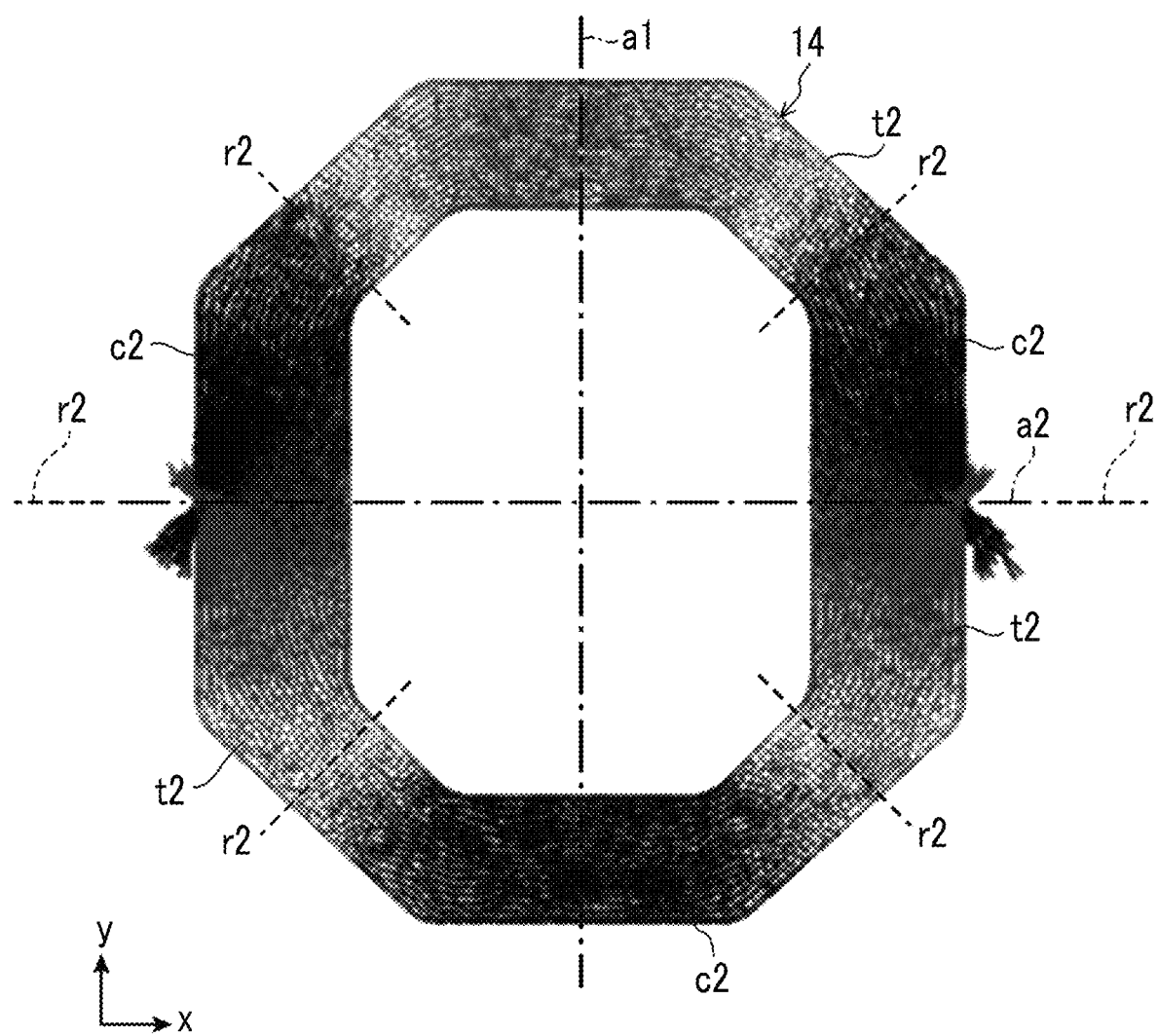
FIG. 13 is a diagram showing in-plane stress distribution generated in an actuator due to shape displacement in the second resonance mode shown in FIG. 12.

In a case where the mirror part 12 and the actuator 14 tilt and oscillate around the second axis a2 in the second resonance mode and are rotated and displaced as shown in FIG. 12, the actuator 14 bends and deforms. Then, as shown in FIG. 13, the piezoelectric film of the actuator 14 has a tensile stress region t2 to which a tensile stress is applied and a compressive stress region c2 to which a compressive stress is applied. In FIG. 13, similarly to FIG. 11, the part where the tensile stress is generated is shown in light gray, and the part where the compressive stress is generated is shown in black. It should be noted that the higher the color density is, the larger the stress is. The stress generated at each position of the piezoelectric film changes with time in accordance with the oscillation. FIG. 13 shows the state of in-plane stress generated in the piezoelectric film at the moment at which the oscillation amplitude in a case of driving in the second resonance mode is maximized.

As shown in FIG. 13, in the part of the actuator 14 that intersects with the second axis a2, the regions adjacent to each other across the second axis a2 indicate stresses having different positive and negative stresses. In the drawing, one region adjacent to the second axis a2 is a tensile stress region t2, and the other region is a compressive stress region c2. In the part that intersects with the first axis a1, the regions adjacent to each other across the first axis a1 indicate stresses having the same sign, but the regions symmetric to the second axis a2 indicate stresses having different positive and negative signs from each other. That is, in the second resonance mode, stress distribution in the actuator 14 is axisymmetric with respect to the first axis a1.

At the boundary between the compressive stress region c2 and the tensile stress region t2, the second stress inversion region is present, which is a region where the direction of stress gradually changes, that is, a region where the positive and negative, of the principal stress component having the maximum absolute value are inverted. Each of the six second stress inversion lines r2 shown in FIG. 13 is located at a center of the second stress inversion region.

The individual electrode parts i1 to i8 of the upper electrodes 33 are formed so as to correspond to division of the piezoelectric film regions t1, t2, c1 and c2 having different stress directions with respect to stress distribution shown in FIGS. 11 and 13. Each individual electrode part is separated by the first stress inversion line r1 and a stress inversion region S including the second stress inversion line r2 (refer to FIG. 1). In the present configuration, among the six first stress inversion lines r1, four first stress inversion lines excluding the two on the first axis a1 coincide with the second stress inversion line r2. As a result, the upper electrode is separated by eight stress inversion regions S.

By providing the individual electrode parts i1 to i8 separated in such a manner, the driving signals around the first axis a1 and the driving signals around the second axis a2 can be input, independently of the individual electrode parts i1 to i8, that is, the piezoelectric parts 41 to 48. By inputting a driving signal according to the stress in the first resonance mode and the second resonance mode in each region, each region can be efficiently displaced. As a result, it is possible to generate a torque around the first axis and the second axis.

The stress distribution during operation using resonance mode oscillation (resonance drive) can be analyzed by parameters such as device dimensions, Young's modulus of material, and device shape given using the known finite element method software through the mode analysis method. In design of the device, stress distribution in the piezoelectric film in a case of driving in the resonance mode is analyzed, and the upper electrodes are divided into individual electrode parts, in accordance with the division of the compressive stress region and the tensile stress region in stress distribution, based on the analysis result. Each piezoelectric part is defined by each individual electrode part.

The driving power for driving in the first resonance mode and the second resonance mode is supplied to each of the piezoelectric parts 41 to 48 from the drive circuit. As the driving signal supplied to the actuator 14, an AC signal or a pulse waveform signal having a frequency that excites resonance can be used. Specific driving signals will be described below together with the driving method.

The drive circuit inputs a driving signal, in which the first driving signal for driving the first resonance mode and the second driving signal for driving the second resonance mode are superimposed, to each of the plurality of piezoelectric parts of the piezoelectric element.

The first driving signal is a signal which includes driving voltage waveforms having opposite phases to each other. The signal is for giving the driving voltage waveform of one of the phases to the piezoelectric part located in the region, in which the principal stress component having the maximum absolute value at the moment in a case where the oscillation amplitude is maximized in a case of driving in the first resonance mode is positive, and for giving the driving voltage waveform of the other phase to the piezoelectric part located in the region in which the principal stress component having the maximum absolute value is negative at the above moment.

The second driving signal is a signal which includes driving voltage waveforms having opposite phases to each other. The signal is for giving the driving voltage waveform of one of the phases to the piezoelectric part located in the region, in which the principal stress component having the maximum absolute value at the moment in a case where the oscillation amplitude is maximized in a case of driving in the second resonance mode is positive, and for giving the driving voltage waveform of the other phase to the piezoelectric part located in the region in which the principal stress component having the maximum absolute value is negative.

Therefore, the drive circuit 50 applies, as the first driving signals, driving signal waveforms having the same phase to the piezoelectric parts located in the regions in which the principal stress component having the maximum absolute value at the moment in a case where the drive amplitude is maximized in a case of driving in the first resonance mode has the same direction (the same sign). That is, a driving signal waveform having the same phase is applied to the piezoelectric parts located in the compressive stress regions, and a driving signal waveform having the same phase is applied to the piezoelectric parts located in the tensile stress regions. Then, the drive circuit applies, as the first driving signals, driving signal waveforms having the opposite phases to the piezoelectric parts located in the regions in which the principal stress component having the maximum absolute value at the moment in a case where the drive amplitude is maximized in a case of driving in the first resonance mode has the different directions (the different signs). That is, driving signal waveforms having opposite phases are applied to the compressive stress regions and the tensile stress regions. The amplitudes of the driving signal waveforms having the same phase may be the same between the piezoelectric parts, or may be different between the piezoelectric parts.

At the same time, the drive circuit 50 applies, as the second driving signals, driving signal waveforms having the same phase to the piezoelectric parts located in the regions in which the principal stress component having the maximum absolute value at the moment in a case where the drive amplitude is maximized in a case of driving in the second resonance mode has the same direction. That is, a driving signal waveform having the same phase is applied to the piezoelectric parts located in the compressive stress regions, and a driving signal waveform having the same phase is applied to the piezoelectric parts located in the tensile stress regions. Then, the drive circuit applies, as the second driving signals, driving signal waveforms having the opposite phases to the piezoelectric parts located in the regions in which the principal stress component having the maximum absolute value at the moment in a case where the drive amplitude is maximized in a case of driving in the second resonance mode has the different directions. That is, driving signal waveforms having opposite phases are applied to the compressive stress regions and the tensile stress regions. The amplitudes of the driving signals having the same phase may be the same between the piezoelectric parts, or may be different between the piezoelectric parts.

The first resonance mode and the second resonance mode can be excited at the same time by applying a driving signal, in which the first driving signal for the first resonance mode and the second driving signal for the second resonance mode are superimposed, to each piezoelectric part. In a case where the driving signal is given to each of the piezoelectric parts 41 to 48 to drive the actuator 14, a positive voltage is applied to the piezoelectric parts located in the regions where the principal stress component having the maximum absolute value in the principal stresses generated in the respective piezoelectric films at the moment of each oscillation is positive, and a negative voltage is applied to the piezoelectric parts located in the regions where the principal stress component having the maximum absolute value is negative. By applying a positive or negative voltage in accordance with the positive or negative of the strain, the piezoelectric force can be converted into the displacement very efficiently.

Therefore, the mirror part 12 can be two-dimensionally driven by only one annular actuator 14.

Figure 14:
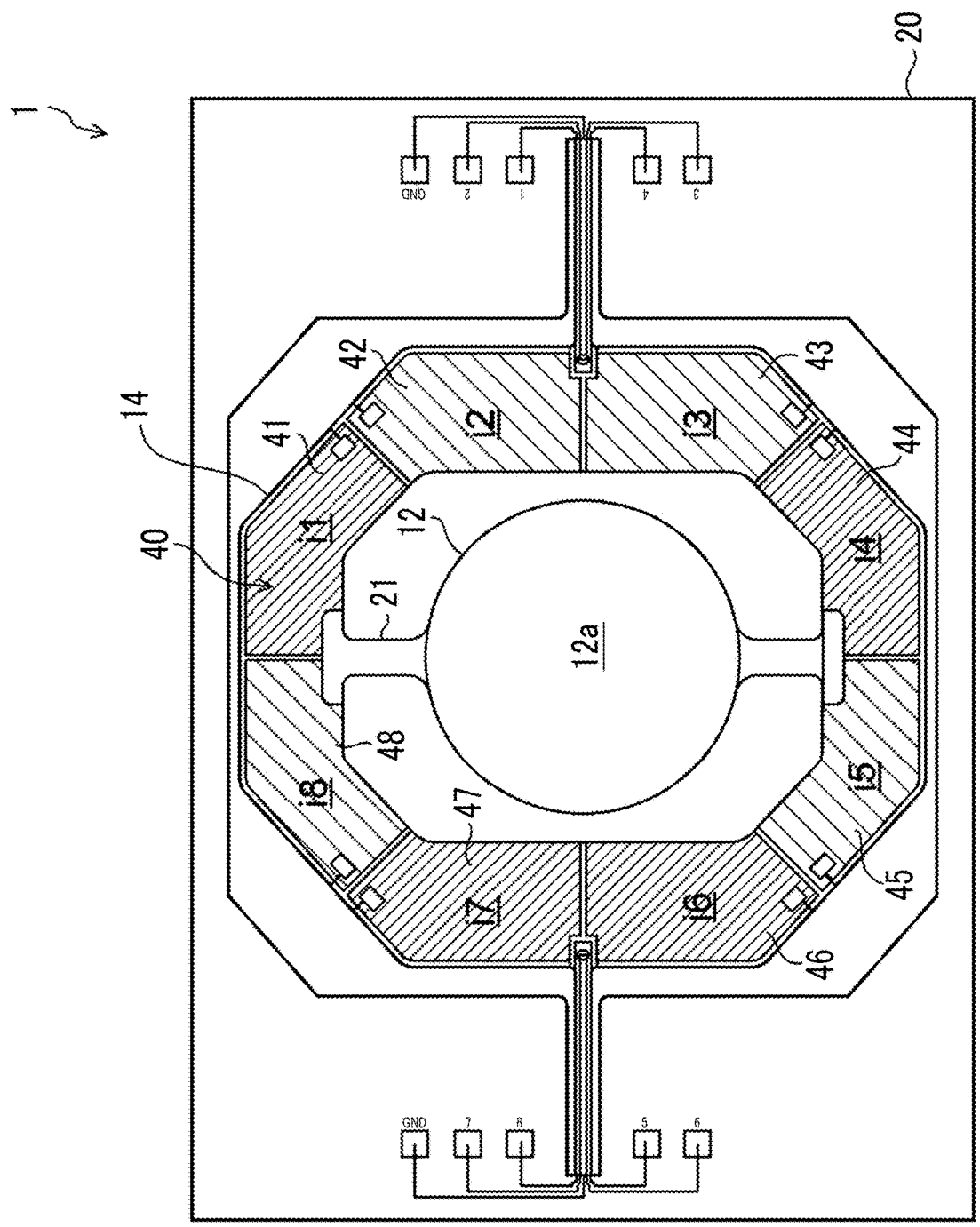
FIG. 14 is a diagram for explaining voltage application in a case of driving around the first axis.
Figure 15:
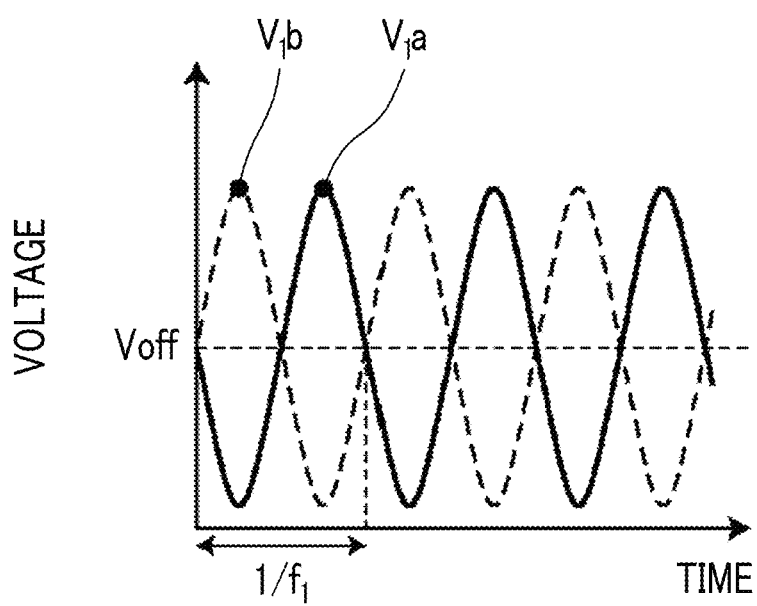
FIG. 15 is a diagram showing an applied driving signal (voltage waveform) in a case of driving around the first axis.
Figure 16:
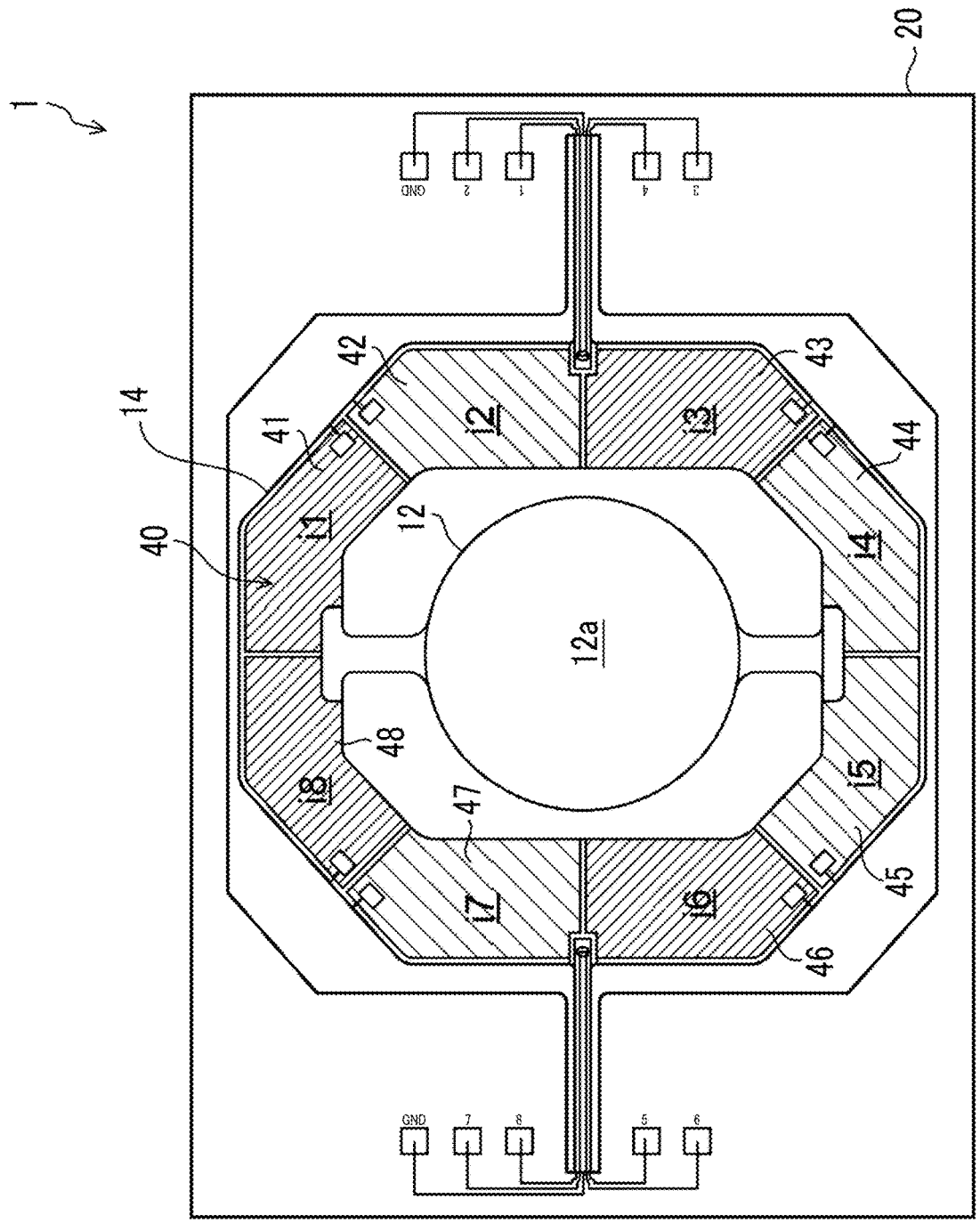
FIG. 16 is a diagram for explaining voltage application in a case of driving around the second axis.
Figure 17:
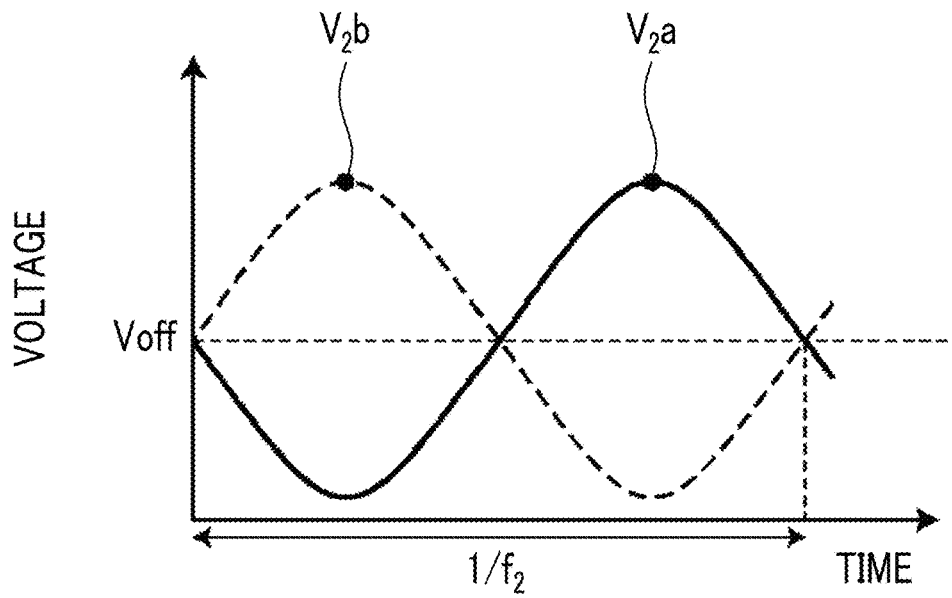
FIG. 17 is a diagram showing an applied driving signal (voltage waveform) in a case of driving around the second axis.

An example of the driving method will be specifically described with reference to FIGS. 14 to 17. FIG. 14 is a diagram showing a piezoelectric part group to which a driving signal having the same phase is input in a case where the first resonance mode is excited. FIG. 15 shows an example of a driving signal which is input to each piezoelectric part group. FIG. 16 is a diagram showing a piezoelectric part group to which a driving signal having the same phase is input in a case where the second resonance mode is excited. FIG. 17 shows a driving signal which is input to each piezoelectric part group.

In FIG. 14, the individual electrode parts of the piezoelectric parts of the first group to which driving signals having the same phase are input in a case where the first resonance mode is excited are indicated by diagonal right downward lines. Further, the individual electrode parts of the piezoelectric parts of the second group to which the driving signal having the opposite phase to that of the first group is input are indicated by diagonal right upward lines.

The individual electrode parts i1, i4, i6, and i7 of the first group correspond to the tensile stress region t1 of FIG. 11, and the first driving signal $V_1a$ for the first resonance mode having the same phase shown in FIG. 15 is input to the individual electrode parts. The individual electrode parts i2, i3, i5, and i8 of the second group correspond to the compressive stress region c1 of FIG. 11, and the first driving signal $V_1b$ for the first resonance mode having the same phase is input to the individual electrode parts. As shown in FIG. 15, the driving signal $V_1a$ applied to the piezoelectric parts of the first group and the driving signal $V_1b$ applied to the piezoelectric parts of the second group have the same first frequency $f_1$ and are signals having opposite phases to each other (phase difference 180°). By applying such a driving signal, a distortion that tilts the actuator 14 around the first axis a1 is generated, and a rotational torque around the first axis a1 is given to the mirror part 12.

The first driving signals $V_1a$ and $V_1b$ are represented as follows, respectively.

$$V_1a = \alpha_1 V_1 \sin(2\pi f_1 t + \pi)$$

$$V_1b = \alpha_1 V_1 \sin 2\pi f_1 t$$

In the above expression, $\alpha_1 V_1$ is the voltage amplitude and t is the time. The offset voltage is not considered in the expression. $V_1$ is a basic voltage amplitude value of the first driving signal, and $\alpha_1$ is a voltage amplitude correction coefficient for the first driving signal. The voltage amplitude given to each individual electrode part may be the same or different. That is, the value of $\alpha_1$ may be different for each piezoelectric part. The voltage amplitude may be set in accordance with the magnitude of the stress generated in each individual electrode part. For example, the larger the magnitude of the stress generated in the individual electrode part, the larger the voltage amplitude.

In a case of collecting and generalizing the first driving signals $V_1a$ and $V_1b$, an expression can be represented as $V_1 = \alpha V_1 \sin(2\pi f_1 t + \beta_1 \pi)$.

Here, $\beta_1$ is a phase correction coefficient for the first driving signal, and is 1 In such a case of $V_1a$ having the first phase and is 0 In such a case of $V_1b$ having the second phase, which is the opposite phase to the first phase.

In FIG. 16, the individual electrode parts of the piezoelectric parts of the third group to which driving signals having the same phase are input in a case where the second resonance mode is excited are indicated by diagonal right downward lines. Further, the individual electrode parts of the piezoelectric parts of the fourth group to which the driving signal having the opposite phase to that of the third group is input are indicated by diagonal right upward lines.

The individual electrode parts i1, i3, i6, and i8 of the third group correspond to the tensile stress region t2 of FIG. 13, and the second driving signal $V_2a$ for the second resonance mode having the same phase shown in FIG. 17 is input to the individual electrode parts. The individual electrode parts i2, i4, i5, and i7 of the fourth group correspond to the compressive stress region c2 in FIG. 13, and the second driving signal $V_2b$ for the second resonance mode having the same phase is input to the individual electrode parts. As shown in FIG. 17, the second driving signals $V_2a$ and $V_2b$ have the same second frequency $f_2$ and are signals having opposite phases to each other (phase difference 180°). By applying such a driving signal, a distortion that tilts the actuator 14 around the second axis a2 is generated. As a result, a rotational torque around the second axis a2 is given to the mirror part 12.

The second driving signals $V_2a$ and $V_2b$ are represented as follows, respectively.

$$V_2a = \alpha_2 V_2 \sin(2\pi f_2 t + \pi)$$

$$V_2b = \alpha_2 V_2 \sin 2\pi f_2 t$$

In the above expression, $\alpha_2 V_2$ is the voltage amplitude and t is the time. The offset voltage is not considered in the expression. $V_2$ is a basic voltage amplitude value of the second driving signal, and $\alpha_2$ is a voltage amplitude correction coefficient for the second driving signal. The voltage amplitude given to each individual electrode part may be the same or different. That is, the value of $\alpha_2$ may be different for each piezoelectric part. The voltage amplitude may be set in accordance with the magnitude of the stress generated in each individual electrode part. For example, the larger the magnitude of the stress generated in the individual electrode part, the larger the voltage amplitude.

In a case of collecting and generalizing the second driving signals $V_2a$ and $V_2b$, an expression can be represented as $V_2 = \alpha_2 V_2 \sin(2\pi f_2 \beta_2 \pi)$.

Here, $\beta_2$ is the phase correction coefficient of the second driving signal, and is 1 In such a case of $V_2a$ having the first phase and is 0 In such a case of $V_2b$ having the second phase, which is the opposite phase to the first phase.

The driving signal, in which the first driving signal for the first resonance mode and the second driving signal for the second resonance mode are superimposed, is applied to each piezoelectric part. For example, $V_1a+V_2a$ is applied to the individual electrode part i1, $V_1b+V_2b$ is applied to the individual electrode part i2, $V_1b+V_2a$ is applied to the individual electrode part i3, and $V_1a+V_2b$ is applied to the individual electrode part i4. Table 1 shows the combinations applied to each piezoelectric part, that is, each individual electrode part.

TABLE 1

| Individual electrode part | 1-dimensional scanning (around first axis) First driving signal | 1-dimensional scanning (around second axis) Second driving signal | 2-dimensional scanning (around first and second axes) Driving signal |
|---|---|---|---|
| i1 | $V_1a$ | $V_2a$ | $V_1a + V_2a$ |
| i2 | $V_1b$ | $V_2b$ | $V_1b + V_2b$ |
| i3 | $V_1b$ | $V_2a$ | $V_1b + V_2a$ |
| i4 | $V_1a$ | $V_2b$ | $V_1a + V_2b$ |
| i5 | $V_1ab$ | $V_2b$ | $V_1b + V_2b$ |
| i6 | $V_1a$ | $V_2a$ | $V_1a + V_2a$ |
| i7 | $V_1a$ | $V_2b$ | $V_1a + V_2b$ |
| i8 | $V_1b$ | $V_2a$ | $V_1b + V_2a$ |

The driving signal applied to the individual electrode parts in (where n is 1 to 8) of each piezoelectric part can be represented by General Expression (1).

$$Vin = \alpha_1 V_1 \sin(2\pi f_1 t + \beta_1 \pi) + \alpha_2 V_2 \sin(2\pi f_2 t + \beta_2 \pi) \quad (1)$$

In Expression (1), the first term is the first driving signal for tilting and oscillating around the first axis, and the second term is the second driving signal for tilting and oscillating around the second axis.

In the example shown in Table 1 above, $\alpha_1$ and $\alpha_2$ are constant. However, $\alpha_1$ and $\alpha_2$ are made different for each individual electrode, and as the magnitude of stress generated in the individual electrode part is larger, the voltage amplitude is made to be larger. Thereby, it is possible to further increase the drive efficiency and further reduce the power consumption.

As described above, driving thereof can be very efficiently performed by controlling so as to apply the driving signal to each piezoelectric part according to the direction of the principal stress component having the maximum absolute value in the principal stresses generated in the piezoelectric film of the first actuator in a case of driving the micromirror device in the first resonance mode and the second resonance mode. The drive circuit is configured to input the driving signal to each piezoelectric part.

In the present embodiment, the lower electrodes of the plurality of piezoelectric parts included in each piezoelectric element are common electrodes. Therefore, the lower electrode is grounded and a predetermined driving signal (driving voltage waveform) is input to the upper electrode. However, in a case where the lower electrode is also an individual electrode, either the lower electrode or the upper electrode may be used as the earth electrode as long as a driving signal can be applied between the lower electrode and the upper electrode.

As the resonance mode, there is not only a mode accompanied by rotation (tilt oscillation) of the mirror part 12 around the axis, but also a mode accompanied by a piston motion in the vertical direction, a twisting motion in a plane, or the like. However, in the micromirror device 1 of the present embodiment, the mirror part 12 is driven by using a resonance mode accompanied by tilt oscillation.

In addition, as the first resonance mode in which the mirror part 12 tilts and oscillates around the first axis, in the resonance mode in which the mirror part 12 and the actuator 14 oscillate in opposite phases, the Q value of the resonance oscillation is higher and the resonance frequency is higher than that in the resonance mode in which the mirror part 12 and the actuator 14 oscillate in the same phase. As a result, it is more suitable that scanning is performed at high speed. In addition, it is preferable to perform driving in the lowest order mode among the resonance modes in which the mirror part 12 and the actuator 14 tilt and oscillate in opposite phases to each other around the first axis since a high Q value can be obtained.

However, the present disclosure is not limited to the above mode. The order mode of the resonance mode to be used may be set appropriately.

Further, as the second resonance mode in which the mirror is tilted and oscillated around the second axis, it is preferable to use the resonance mode in which the actuator 14 and the mirror part 12 are tilted and oscillated integrally since the resonance frequency is low and is suitable for a low-speed operation.

However, the present disclosure is not limited to the above mode. The order mode of the resonance mode to be used may be set appropriately.

The stress distribution occurring in the actuator differs depending on which order of the resonance mode is used. Therefore, it is necessary to determine the resonance mode to be used in a case of driving and then dispose the individual electrode parts, based on the stress distribution in the resonance mode. In the present example, the lowest-order mode among the resonance modes, in which the mirror part 12 and the actuator 14 tilt and oscillate in opposite phases to each other around the first axis, is set as the first resonance mode, and the lowest-order mode among the resonance modes accompanied by tilt oscillation on the lower frequency side than the first resonance mode is set as the second resonance mode.

The piezoelectric element that is provided in the actuator 14 will be described. As described above, the piezoelectric element has a laminated structure of a lower electrode 31, a piezoelectric film 32, and an upper electrode 33.

The thickness of the lower electrode and the upper electrode is not particularly limited, and is, for example, about 200 nm. The thickness of the piezoelectric film is not particularly limited as long as it is 10 μm or less, and is usually 1 μm or more, for example, 1 to 5 μm. The method for forming the lower electrode, the upper electrode and the piezoelectric film is not particularly limited, but the vapor deposition method is preferable, and the sputtering method is particularly preferable.

The main components of the lower electrode are not particularly limited, and are metals or metal oxides such as Au, Pt, Ir, $IrO_2$, $RuO_2$, $LaNiO_3$, and $SrRuO_3$, and combinations thereof.

The main component of the upper electrode is not particularly limited, and examples thereof include materials exemplified for the lower electrode, electrode materials generally used in semiconductor processes such as Al, Ti, Ta, Cr, and Cu, and combinations thereof.

Examples of the piezoelectric film include those containing one or more types of perovskite-type oxides (P) represented by the Expression.

General Expression $ABO_3$ (P)

(In the Expression, A is an element of A site, and at least one element containing Pb.

B is an element of B site, and is at least one element selected from the group consisting of Ti, Zr, V, Nb, Ta, Sb, Cr, Mo, W, Mn, Sc, Co, Cu, In, Sn, Ga, Zn, Cd, Fe, and Ni.

O is an oxygen element.

The standard molar ratio of A-site element, B-site element, and oxygen element is 1:1:3, but the molar ratio may deviate from the reference molar ratio within a range in which a perovskite structure can be obtained.)

Examples of the perovskite-type oxide represented by the above-mentioned general Expression include lead-containing compounds such as lead titanate, lead zirconate titanate (PZT), lead zirconate tit, lead zirconate tit lanthanate, lead zirconate titanate lanthanate, lead zirconate titanate magnesium niobate, lead zirconate titanate titanate, and lead zirconate titanate zinc niobate, and mixed crystal systems thereof; lead-free compounds such as barium titanate, strontium barium titanate, bismas sodium niobate, potassium niobate potassium, niobate, sodium, potassium niobate, lithium niobate, and bismas ferrite, and mixed crystal systems thereof.

Further, the piezoelectric film of the present embodiment preferably contains one kind or two or more kinds of perovskite-type oxides (PX) represented by the Expression.

  (PX)

(In the Expression, A is an element of A site, and at least one element containing Pb. M is at least one element selected from a group which consists of V, Nb, Ta, and Sb.

$0<x<b$, $0<y<b$, $0\leq b-x-y$, and a:b:c=1:1:3 are standard, but these molar ratios may deviate from the reference molar ratio within the range where a perovskite structure can be obtained.)

The piezoelectric film consisting of the perovskite-type oxide represented by the above general Expressions (P) and (PX) has a high piezoelectric strain constant ($d_{31}$ constant). Therefore, the piezoelectric actuator comprising such a piezoelectric film is excellent in displacement characteristics. The perovskite-type oxide represented by the General Expression (PX) has a higher piezoelectric constant than that represented by the General Expression (P).

Further, the piezoelectric actuator comprising the piezoelectric film which consists of the perovskite-type oxide represented by the general Expressions (P) and (PX) has a voltage-displacement characteristic with excellent linearity in the driving voltage range. These piezoelectric materials exhibit favorable piezoelectric properties in carrying out the technique of the present disclosure.

EXAMPLES

Hereinafter, the micromirror devices of examples of the present disclosure will be described.

Example 2

The micromirror device having the configurations shown in FIG. 1 was manufactured as Example 1 by the following procedure.

Manufacturing Method (Step 1) A Ti layer with 30 nm was formed and an Ir layer with 150 nm was formed, at a substrate temperature of 350° C., by a sputtering method, on an silicon on insulator (SOI) substrate having a laminated structure of a Si handle layer 350 μm, a silicon oxide ($SiO_2$) box layer 1 μm, and a Si device layer 100 μm. The laminated structures of the Ti layer and the Ir layer correspond to the lower electrode 31 in FIG. 2.

(Step 2) A piezoelectric film with 3 μm was formed on the substrate on which the lower electrodes (Ti/Ir) obtained above were laminated and formed using a radio frequency (RF) sputtering device. As the target material for sputtering film formation for the piezoelectric film, a material having a composition of $Pb_{1.3}$ $((Zr_{0.52} Ti_{0.48})_{0.88} Nb_{0.12}) O_3$ was used. The film forming pressure was 2.2 mTorr, and the film forming temperature was 450° C. The obtained piezoelectric film was an Nb-doped PZT thin film to which Nb was added at an atomic composition ratio of 12%.

(Step 3) An upper electrode including the plurality of individual electrode parts using a Pt/Ti laminated structure was patterned by a lift-off method, on the substrate on which the piezoelectric film obtained above was formed.

(Step 4) After that, the piezoelectric film and the lower electrode were pattern-etched by inductively coupled plasma (ICP) dry etching.

(Step 5) Further, an insulating layer consisting of $SiO_2$ was formed on the entire surface by a chemical vapor deposition method (TEOS-CVD: tetraethoxysilane-chemical vapor deposition) using tetraethoxysilane as a raw material, and then the insulating layer was patterned by the ICP dry etching.

(Step 6) A laminated structure of Au/Ti was formed into a pattern, and a reflecting surface of a mirror part, an electrode pad, and a wiring layer were formed, by the lift-off method.

(Step 7) The device layer was pattern-etched by a silicon dry etching process to process the shapes of the actuator, the mirror part, and the fixing member.

(Step 8) Next, the handle layer was subject to deep-drilled reactive ion etching from the back surface of the substrate. Basically, the handle layer was removed such that a part to be a fixing member remains.

(Step 9) Finally, the micromirror device 1 described with reference to FIG. 1 was manufactured by removing the box layer from the back surface by dry etching.

In the above manufacturing step, the reflecting surface of the mirror part is formed in Step 6, but the reflecting surface may be formed by using a reflective material different from the material of the electrode pad and the wiring layer. In that case, for example, subsequently to Step 6, the reflecting surface may be formed by a lift-off method or the like.

The size of each element of the micromirror device of the present example is as follows.

The diameter of the mirror part 12 was set to 2.7 mm, the length of the first connecting part 21 along the direction of the first axis a1 (the length from the outer periphery of the mirror to the inner periphery of the actuator) was set to 0.77 mm, the width in the direction of the second axis a2 was set to 0.35 mm, the length of the second connecting part 22 along the direction of the second axis a2 (length from the outer periphery of the actuator to the connection point with the fixing part) was set to 2.0 mm, and the width along the direction of the first axis a1 was set to 0.14 mm.

The thicknesses of the mirror part 12, the actuator 14, the first connecting part 21, and the second connecting part 22 are equal to the thickness of the device layer.

In the micromirror device having the present configuration, the sizes of the actuator 14 and the first connecting part 21 are set such that the frequency of the first resonance mode on the high-speed drive side is 20 kHz, and the second resonance mode is configured to have the smallest order among the resonance modes with tilt oscillation on the lower frequency side than the first resonance mode.

In the present example, as described with reference to FIGS. 14 to 17, the first driving signal having the first resonance frequency and the second driving signal having the second resonance frequency are superimposed and driven by the driving signal.

Reference Example

Figure 18:
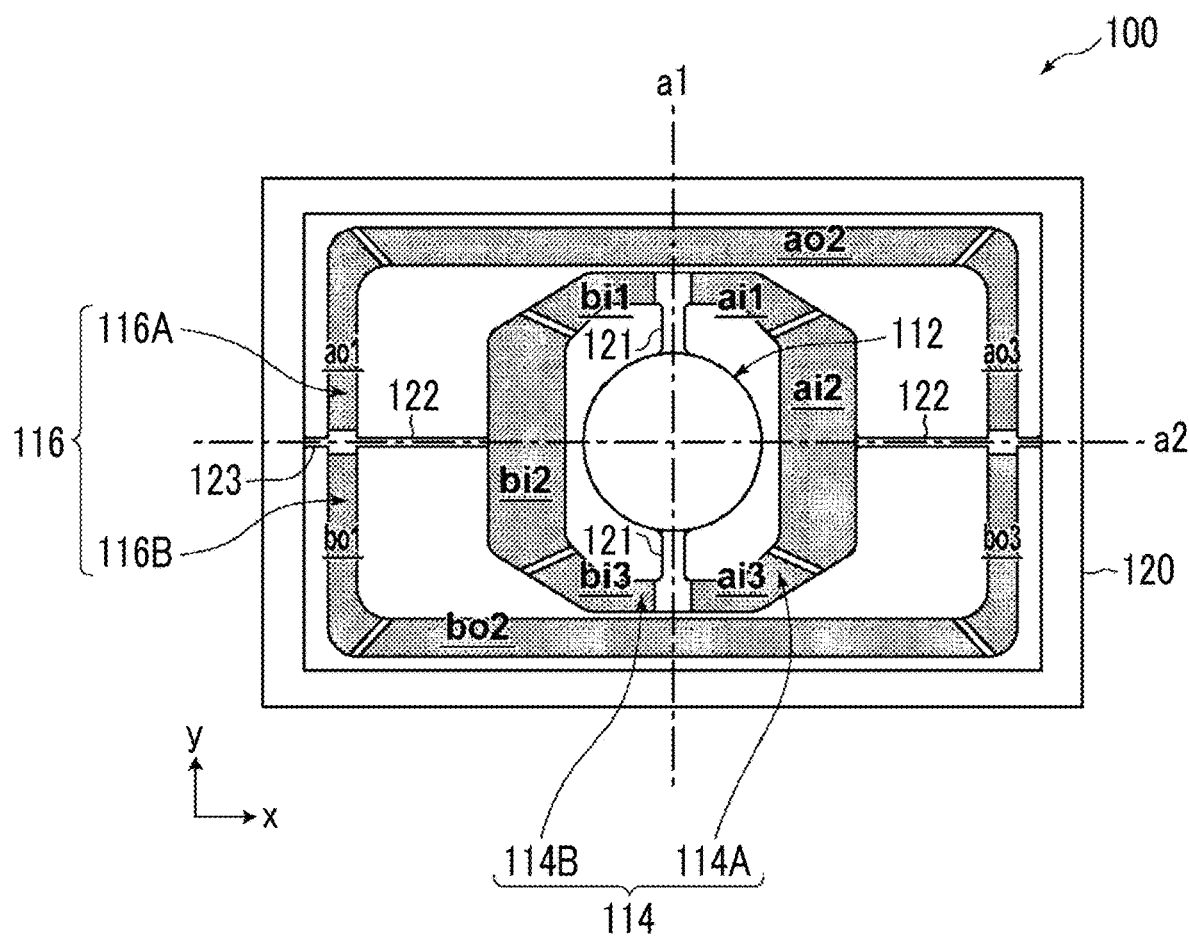
FIG. 18 is a plan view of a reference example micromirror device.

FIG. 18 shows a plan view of the micromirror device 101 of a reference example. The micromirror device of the reference example was manufactured by the same manufacturing procedure as in the example. The micromirror device 101 of the reference example comprises a mirror part 112, an annular first actuator 114 disposed so as to surround the mirror part 112, an annular second actuator 116 surrounding the first actuator 114, a fixing part 120, a first connecting part 121, a second connecting part 122, and a third connecting part 123. Each of the actuators 114 and 116 is a piezoelectric actuator provided with a piezoelectric element.

The first actuator 114 comprises a pair of semi-annular actuator parts 114A and 114B each provided with a piezoelectric element, and the pair of semi-annular actuator parts 114A and 114B is connected on the first axis a1 through the first connecting part 121 so as to surround the mirror part 112. The second actuator 116 comprises a pair of semi-annular actuator parts 116A and 116B each provided with a piezoelectric element, and the pair of semi-annular actuator parts 116A and 116B is connected on the second axis a2 through the second connecting part 122 so as to surround the first actuator 114.

In the first actuator 114 and the second actuator 116, the region indicated by hatching is an individual electrode part constituting the upper electrode of the piezoelectric element. Each of the upper electrodes of the semi-annular actuator parts 114A, 114B, 116A, and 116B consists of three individual electrode parts, and comprises three piezoelectric parts defined by the individual electrode parts. The first actuator 114 comprises a total of six individual electrode parts ai1 to ai3 and bi1 to bi3. The second actuator 116 comprises a total of six individual electrode parts ao1 to ao3 and bo1 to bo3.

The first actuator 114 is in charge of driving tilt oscillation around the first axis a1, and the second actuator 116 is in charge of driving tilt oscillation around the second axis a2.

Figure 19:
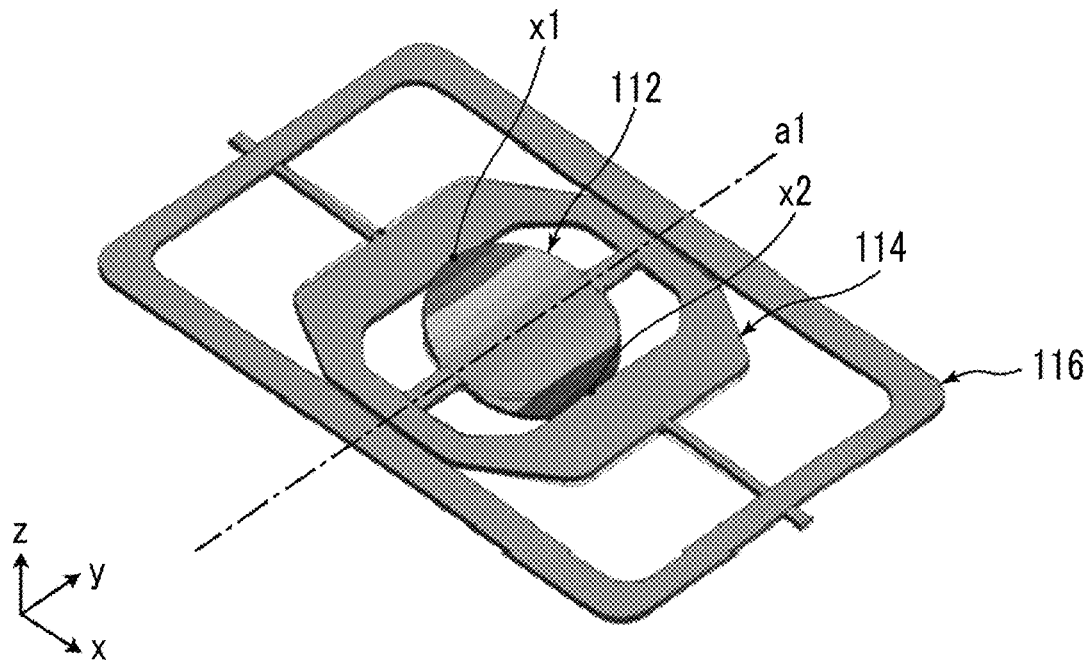
FIG. 19 is a simulation diagram of shape displacement in the first resonance mode accompanied by tilt oscillation of the mirror part around the first axis in the micromirror device of the reference example.

FIG. 19 is a simulation diagram showing a state where the mirror part 112 tilts and oscillates around the first axis a1 in the first resonance mode, and shows a state where one end x1 of the mirror part 112 in the x-axis direction around the first axis a1 as a center is tilted and displaced in the +z direction and the other end x2 thereof in the x-axis direction is tilted and displaced in the −z direction. In FIG. 19, the fixing part is removed, and the shade of color indicates the amount of displacement.

In the maximum displacement state in a case where the first actuator is driven in the first resonance mode, the individual electrode parts of the first semi-annular actuator parts 114A and 114B provided in accordance with whether the sign of the principal stress component having the maximum absolute value among the principal stresses generated in the in-plane direction of the piezoelectric film of the first actuator is positive or negative, and separated by the stress inversion region.

In the maximum displacement state in a case where the second actuator is driven in the second resonance mode, the individual electrode parts of the second semi-annular actuator parts 116A and 116B provided in accordance with whether the sign of the principal stress component having the maximum absolute value among the principal stresses generated in the in-plane direction of the piezoelectric film of the second actuator is positive or negative, and is separated by the stress inversion region.

Figure 20:
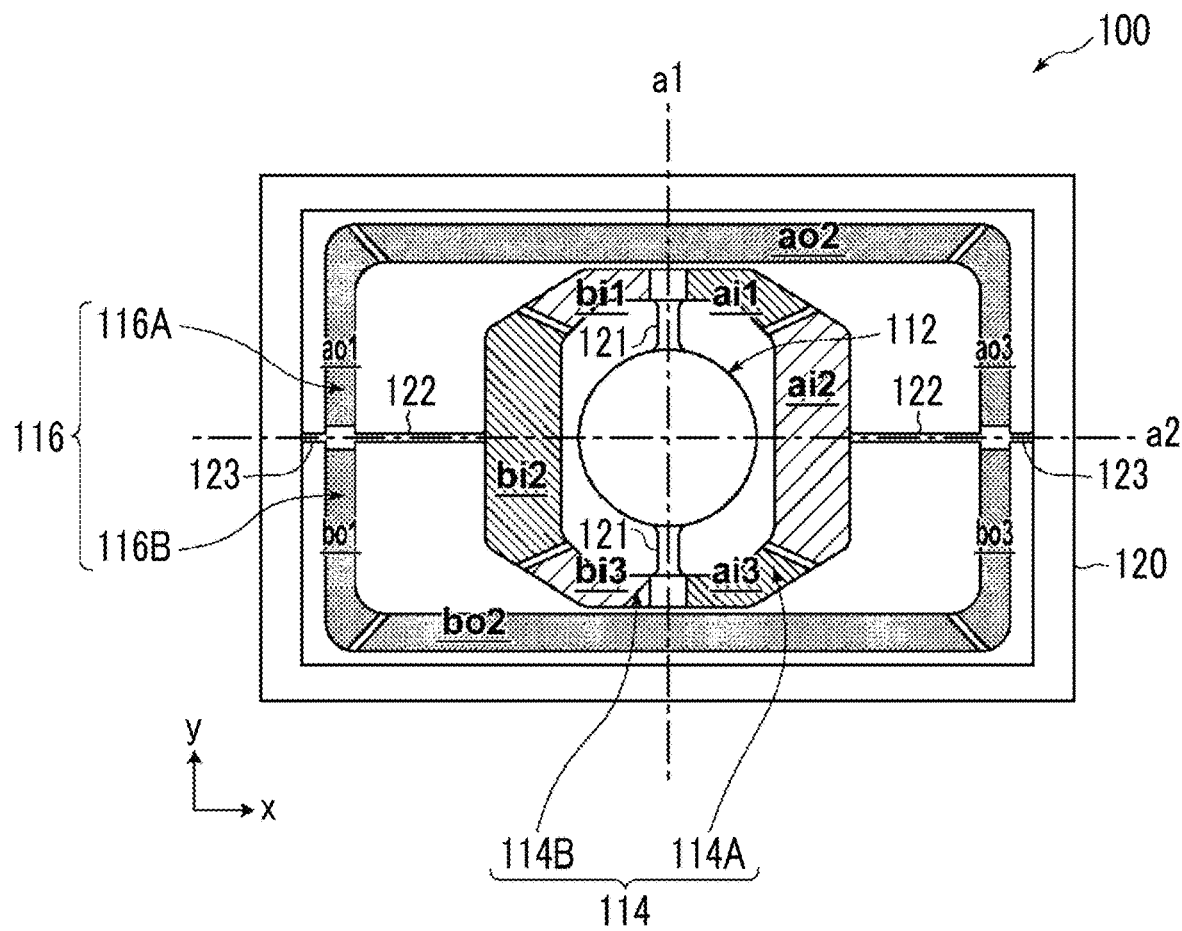
FIG. 20 is a diagram for explaining a driving method in a case of driving around the first axis of the micromirror device of the reference example.

In the first actuator 114, the individual electrode parts driven in the same phase are indicated by the same diagonal lines. In FIG. 20, the individual electrode parts ai1, ai3, and bi2 indicated by the diagonal right downward lines correspond to the tensile stress region t1. In FIG. 20, the individual electrode parts ai2, bi1, and bi3 indicated by the diagonal right upward lines correspond to the compressive stress region c1. A first driving signal for the first resonance mode having opposite phases is applied between the individual electrode parts corresponding to the tensile stress regions t1 and the individual electrode parts corresponding to the compressive stress regions c1.

As shown in FIG. 19, a driving signal was input to each piezoelectric part of the first actuator 114 in order to tilt and oscillate the mirror part 112 around the first axis a1. Here, the high-speed driving signal of $V_1a$ shown in FIG. 15 was input to the individual electrode parts ai1, ai3, and bi2 indicated by the diagonal right downward line, and the high-speed driving signal of $V_1b$ shown in FIG. 15 was input to the individual electrode parts ai2, bi1, and bi3 indicated by the diagonal right upward line. That is, driving signals having the same high-speed frequency and opposite phases to each other were input to the individual electrode parts ai1, ai3, and bi2 and the individual electrode parts ai2, bi1, and bi3.

Figure 21:
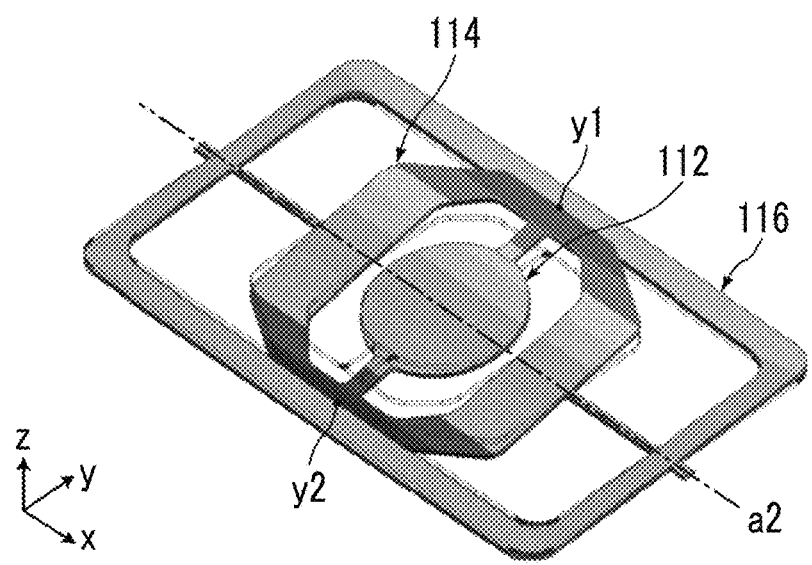
FIG. 21 is a simulation diagram of shape displacement in the second resonance mode accompanied by tilt oscillation of the mirror part around the second axis in the micromirror device of the reference example.
Figure 22:
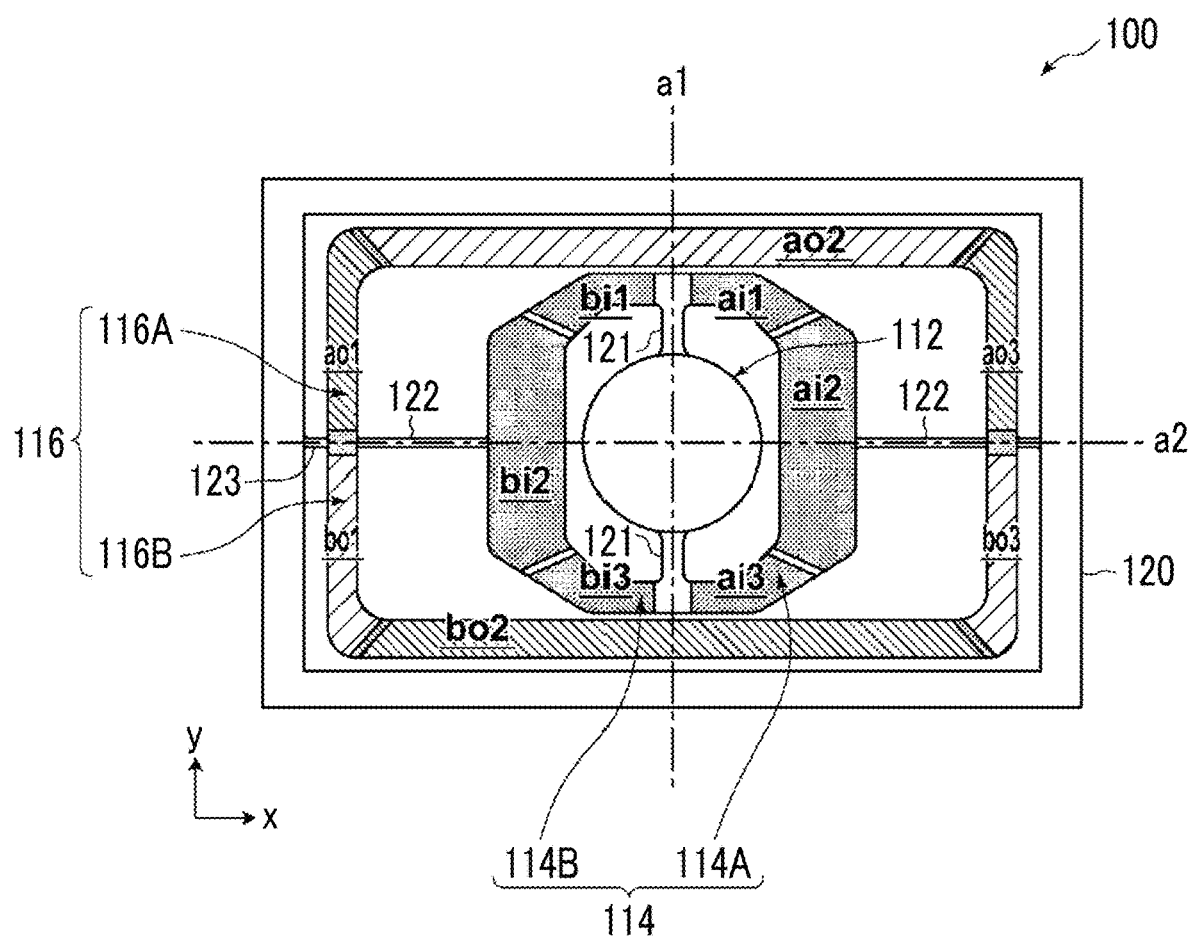
FIG. 22 is a diagram for explaining a driving method in a case of driving around the second axis of the micromirror device of the reference example.

FIG. 21 is a simulation diagram showing a situation in which the mirror part 112 and the first actuator 114 tilt and oscillate around the second axis a2 in the second resonance mode, and shows a state where one end y1 in the y-axis direction of the first actuator 114 is tilted and displaced in the +z direction and the other end y2 in the y-axis direction is tilted and displaced in the −z direction with respect to the second axis a2 as a center of the mirror part 112 and the first actuator 114. Similarly to FIG. 19, in FIG. 21, the shade of color indicates the amount of displacement.

As shown in FIG. 21, a driving signal was input to each piezoelectric part of the second actuator 116 in order to tilt and oscillate the first actuator 114 and the mirror part 112 around the second axis a2. Here, the low-speed driving signal of $V_2a$ shown in FIG. 17 was input to the individual electrode parts ao1, ao3, and bo2 indicated by the diagonal right downward line, and the low-speed driving signal of $V_2b$ shown in FIG. 17 was input to the individual electrode parts ao2, bo1, and bo3 indicated by the diagonal right upward line. That is, driving signals having opposite phases to each other at the same low-speed frequency were input to the individual electrode parts ao1, ao3, and bo2 and the individual electrode parts ao2, bo1, and bo3.

The first resonance frequency and the second resonance frequency were measured for the micromirror devices of the example and the reference example. Further, the voltage amplitude of the first driving signal, which is necessary to perform scanning of 45° around the first axis a1 is performed in a case of driving in the first resonance mode and the second resonance mode respectively using the drive waveforms of the first resonance frequency and the second resonance frequency, was examined. In addition, the voltage amplitude of the second driving signal, which is necessary to perform scanning of 30° around the second axis a2, was examined. Table 1 shows the results. The optical scanning angle was measured in the following method. Laser is vertically incident onto the reflecting surface of the mirror part of the micromirror device, the length of the scanning line is measured using a ruler, and the like, and the total angle of scanning is calculated from the geometrical relationship.

TABLE 2

|  | Example | Reference example |
| --- | --- | --- |
| Minor size (diameter) | 2.7 mm | 2.7 mm |
| Structure body part size | 9 mm × 5 mm | 11 mm × 7 mm |

TABLE 2-continued

|  | Example | Reference example |
|---|---|---|
| Resonance frequency (around second axis) | 1.2 kHz | 1.8 kHz |
| Resonance frequency (around first axis) | 20 kHz | 19 kHz |
| Voltage amplitude (around second axis) | 11 | 10 |
| Voltage amplitude (around first axis) | 12.5 | 12.5 |

In Table 1, the body size of the structure is represented by the length in the x direction×the length in the y direction of the inner periphery of the solid frame.

The example and the reference example are micromirror devices provided with mirror parts having the same size. However, in the example, the size of the body part of the structure can be made smaller than that of the reference example.

In carrying out the technique of the present disclosure, the present disclosure is not limited to the configuration and manufacturing method of the present example, and the substrate material, electrode material, piezoelectric material, film thickness, film forming conditions, and the like may be appropriately selected in accordance with the purpose.

The present disclosure of JP2019-086635A filed on Apr. 26, 2019 is incorporated herein by reference in its entirety.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. A micromirror device, comprising:
a mirror part that has a reflecting surface configured to reflect incident light;
an actuator that has an annular shape and surrounds the mirror part;
a first connecting part that connects the mirror part and the actuator, such that the mirror part is rotatable around a first axis;
a fixing part that is provided at an outer periphery of the actuator; and
a second connecting part that connects the actuator and the fixing part, such that the actuator is rotatable around a second axis intersecting the first axis, wherein:
the actuator applies a rotational torque around the first axis to the mirror part and applies a rotational torque around the second axis to the mirror part so as to rotationally drive the mirror part around the first axis and the second axis,
the actuator is a piezoelectric actuator including a piezoelectric element comprising a lower electrode, a piezoelectric film, and an upper electrode laminated on an oscillation plate, and
the upper electrode consists of a plurality of individual electrode parts, each of which is separated by a first stress inversion region and a second stress inversion region, and the piezoelectric element includes a plurality of piezoelectric parts respectively defined by the plurality of individual electrode parts, the first stress inversion region being a region in which positive and negative, of a principal stress component having a maximum absolute value among a principal stress generated in an in-plane direction of the piezoelectric film, are inverted in a maximum displacement state, in a case of driving in a first resonance mode in which the mirror part is tilted and oscillated around the first axis, and the second stress inversion region being a region in which positive and negative, of a principal stress component having a maximum absolute value among a principal stress generated in the in-plane direction of the piezoelectric film, are inverted, in a case of driving in a second resonance mode in which the mirror part is tilted and oscillated around the second axis.

2. The micromirror device according to claim 1, wherein the first connecting part connects the mirror part and the actuator on the first axis.

3. The micromirror device according to claim 1 wherein the second connecting part connects the actuator and the fixing part on the second axis.

4. The micromirror device according to claim 1, wherein the upper electrode includes at least eight individual electrode parts as the plurality of individual electrode parts, and the plurality of individual electrode parts are disposed symmetrically about the first axis and the second axis.

5. The micromirror device according to claim 1, further comprising a drive circuit that inputs a driving signal to each of the plurality of piezoelectric parts of the actuator.

6. The micromirror device according to claim 5, wherein the drive circuit inputs, to the plurality of piezoelectric parts, driving signals for driving the micromirror device in the first resonance mode in which the mirror part tilts and oscillates around the first axis and for driving the micromirror device in the second resonance mode in which the mirror part tilts and oscillates around the second axis.

7. The micromirror device according to claim 6, wherein the drive circuit inputs, as the driving signals, a driving signal obtained by superimposing a first driving signal and a second driving signal, the first driving signal being a signal in which a driving voltage waveform applied to the piezoelectric part located in a region in which the principal stress component having the maximum absolute value is positive, and a driving voltage waveform applied to the piezoelectric part located in a region in which the principal stress component having the maximum absolute value is negative, are in a relationship of opposite phases to each other at a moment at which an oscillation amplitude, in a case of driving in the first resonance mode is maximized, and the second driving signal being a signal in which a driving voltage waveform applied to the piezoelectric part located in a region in which the principal stress component having the maximum absolute value is positive, and a driving voltage waveform applied to the piezoelectric part located in a region in which the principal stress component having the maximum absolute value is negative, are in a relationship of opposite phases to each other at a moment at which an oscillation amplitude in a case of driving in the second resonance mode is maximized.

* * * * *